(12) United States Patent
Song et al.

(10) Patent No.: US 11,368,360 B2
(45) Date of Patent: Jun. 21, 2022

(54) ELECTRONIC DEVICE, AND SOFTWARE SETTING METHOD BASED ON SUBSCRIBER IDENTITY MODULE IN ELECTRONIC DEVICE

(71) Applicant: Samsung Electronics Co., Ltd., Gyeonggi-do (KR)

(72) Inventors: Jong-Hyuk Song, Seoul (KR); Jung-Hyuck Lee, Gyeonggi-do (KR); Sung-Jin Jung, Seoul (KR); Dong-Jin Sohn, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/609,801

(22) PCT Filed: May 31, 2018

(86) PCT No.: PCT/KR2018/006230
§ 371 (c)(1),
(2) Date: Oct. 31, 2019

(87) PCT Pub. No.: WO2018/221982
PCT Pub. Date: Dec. 6, 2018

(65) Prior Publication Data
US 2020/0052960 A1 Feb. 13, 2020

(30) Foreign Application Priority Data

May 31, 2017 (KR) .......................... 10-2017-0068018

(51) Int. Cl.
*H04L 41/0803* (2022.01)
*G06F 8/61* (2018.01)
(Continued)

(52) U.S. Cl.
CPC ............ *H04L 41/0803* (2013.01); *G06F 8/61* (2013.01); *G06F 9/44505* (2013.01); *H04L 67/34* (2013.01); *H04W 8/183* (2013.01)

(58) Field of Classification Search
CPC .... H04L 41/0803; H04L 67/34; H04W 8/183; G06F 8/61; G06F 9/44505
(Continued)

(56) References Cited

U.S. PATENT DOCUMENTS

2008/0085737 A1    4/2008  Kim
2008/0147838 A1*   6/2008  Hirsch ................... H04L 41/28
                                                                709/223
(Continued)

FOREIGN PATENT DOCUMENTS

KR    10-2007-0038355 A    4/2007
KR    10-2012-0052073 A    5/2012
(Continued)

*Primary Examiner* — David R Lazaro
*Assistant Examiner* — Mariegeorges A Henry
(74) *Attorney, Agent, or Firm* — Cha & Reiter, LLC

(57) ABSTRACT

An electronic device, and a software setting method based on a subscriber identity module in an electronic device, according to various embodiments of the present invention, provide first setting information corresponding to a first communication network provider according to the recognition, by the electronic device, of a first subscriber identity module including information of the first communication network provider among a plurality of communication network providers, confirm second network setting information corresponding to a second communication network provider according to the recognition, by the electronic device, of a second subscriber identity module including information of the second communication network provider among the plurality of communication network providers, and can set a network of the electronic device on the basis of the first setting information and the second network setting information corresponding to the second communication network provider. Additional various embodiments are possible.

11 Claims, 15 Drawing Sheets

(51) Int. Cl.
*G06F 9/445* (2018.01)
*H04L 67/00* (2022.01)
*H04W 8/18* (2009.01)

(58) Field of Classification Search
USPC .................................................. 709/220, 223
See application file for complete search history.

(56) References Cited

U.S. PATENT DOCUMENTS

| | | | |
|---|---|---|---|
| 2009/0003240 A1* | 1/2009 | Negron | H04L 41/0813 |
| | | | 370/254 |
| 2009/0181662 A1 | 7/2009 | Fleischman et al. | |
| 2010/0005452 A1* | 1/2010 | Anson | G06F 9/44505 |
| | | | 717/121 |
| 2012/0122441 A1 | 5/2012 | Kim | |
| 2012/0233357 A1 | 9/2012 | Chen et al. | |
| 2014/0106713 A1* | 4/2014 | Skog | H04W 8/205 |
| | | | 455/411 |
| 2015/0236912 A1* | 8/2015 | Zhang | H04L 41/0889 |
| | | | 370/338 |
| 2016/0020804 A1 | 1/2016 | Lee et al. | |
| 2017/0127214 A1 | 5/2017 | Sohn et al. | |
| 2017/0289788 A1* | 10/2017 | Lalwaney | H04L 41/0803 |

FOREIGN PATENT DOCUMENTS

| | | |
|---|---|---|
| KR | 10-2016-0010237 A | 1/2016 |
| KR | 10-2017-0049897 A | 5/2017 |

\* cited by examiner

ELECTRONIC DEVICE, AND SOFTWARE SETTING METHOD BASED ON SUBSCRIBER IDENTITY MODULE IN ELECTRONIC DEVICE

CROSS REFERENCE TO RELATED APPLICATIONS

This application is a National Phase Entry of PCT International Application No. PCT/KR2018/006230, which was filed on May 31, 2018, and claims a priority to Korean Patent Application No. 10-2017-0068018, which was filed on May 31, 2017, the contents of which are incorporated herein by reference.

TECHNICAL FIELD

Various embodiments of the present invention relate to electronic devices and methods of configuring software based on subscriber identity modules in electronic devices.

BACKGROUND ART

An open market may include units distinguished per particular region (e.g., countries, such as Korea or Southeast Asian countries) or per confederation (e.g., the European union (EU)), as units of software publication. For example, if a manufacturer publishes software for an open market in a particular region, electronic devices equipped with the software may be configured to operate in the region.

An open market customization (OMC) package contains customer software configuration (CSC) information required by the operator (e.g., a communication operator or carrier) or service provider, and the electronic device may be operated with the information-containing file applied to the electronic device.

The manufacturer of the electronic device publishes software to be equipped in the electronic device for open market purposes and equips the electronic device with the software and, if the electronic device is activated, controls the electronic device to recognize the operator and allow the software configuration related to the particular communication carrier to be applied to the electronic device.

DETAILED DESCRIPTION OF THE INVENTION

Technical Problem

Upon recognizing a subscriber identity module (SIM) containing information related to the carrier, the electronic device may identify the information contained in the SIM and send a request for relevant software to, and receive the relevant software from, a server.

As the entire software configuration received is applied to the electronic device, the prior applications or resources used may be changed to applications or resources related to the recognized SIM which may then be installed. This may cause inconvenience to the user of the electronic device.

According to various embodiments of the present invention, an electronic device and a subscriber identity module-based software configuration method in an electronic device may previously store OMC packages for a plurality of carriers and identify and configure the OMC package of a corresponding SIM based on the information contained in the SIM.

According to various embodiments of the present invention, an electronic device and a subscriber identity module-based software configuration method in an electronic device may configure an OMC package including a network dependent element for a network configuration and a non-network dependent element for a non-network configuration and perform control so that at least some of the components included in the electronic device are applied to the electronic device according to the user's selection.

Technical Solution

According to various embodiments of the present invention, an electronic device comprises a communication circuit configured to transmit and receive data based on at least one piece of network information, a processor, and a memory, wherein the memory may store instructions configured to, when executed, enable the processor to install first configuration information corresponding to a first communication network operator among a plurality of communication network operators as a first subscriber identity module including information about the first communication network operator is recognized in the electronic device, identify second network configuration information corresponding to a second communication network operator among the plurality of communication network operators as a second subscriber identity module including information about the second communication network operator is recognized in the electronic device, and configure a network of the electronic device based on the first configuration information and the second network configuration information corresponding to the second communication network operator.

According to various embodiments of the present invention, a method of configuring software based on a subscriber identity module in an electronic device comprises installing first configuration information corresponding to a first communication network operator among a plurality of communication network operators as a first subscriber identity module including information about the first communication network operator is recognized in the electronic device, identifying second network configuration information corresponding to a second communication network operator among the plurality of communication network operators as a second subscriber identity module including information about the second communication network operator is recognized in the electronic device, and configuring a network of the electronic device based on the first configuration information and the second network configuration information corresponding to the second communication network operator.

Advantageous Effects

According to various embodiments of the present invention, an electronic device and a subscriber identity module-based software configuration method in an electronic device may identify configuration information corresponding to information about a recognized SIM and perform control so that at least part of the non-network dependent element and network dependent element included in the configuration information is applied to the components of the electronic device, thus providing network configurations fitting the electronic device configuration, as required by various carriers.

MODE FOR CARRYING OUT THE INVENTION

Figure 1:
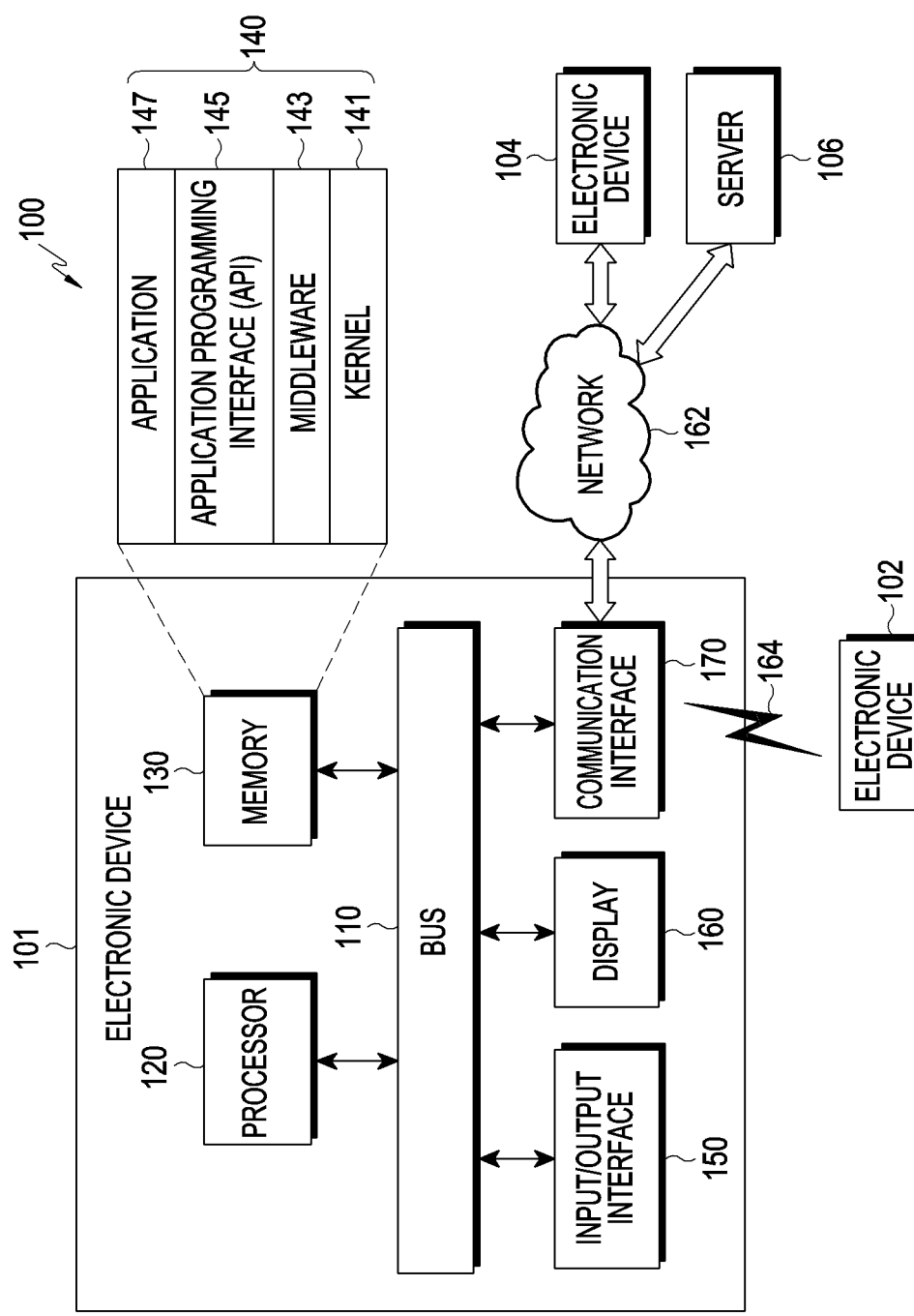
FIG. 1 is a view illustrating an example network environment according to various embodiments of the present invention.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

According to various embodiments of the present invention, in an electronic device, as SIMs are exchanged (e.g., the recognized SIM is deactivated, and another SIM is recognized), at least partial configuration of the software equipped in the electronic device may be varied. For example, at least some of the user application configuration (customer application), network configuration (e.g., network information or connecting profile, or customer software configuration (CSC) features), or resource (e.g., power-on animation or ring tone) configuration may be varied. Besides, various software configurations may be varied as required by the carrier.

According to various embodiments of the present invention, when the embedded SIM (eSIM) is activated or switched, the electronic device may determine that the SIM is recognized (or inserted). For example, when an eSIM profile of a particular eSIM is selected or is changed to another eSIM profile, the selected or changed eSIM may be determined to have been recognized. The electronic device may determine that the prior eSIM determined to have been recognized has been removed from the electronic device.

According to various embodiments of the present invention, performing control so that the entire configuration included in pre-stored software (e.g., carrier A's OMC package) for a particular carrier (e.g., carrier A) is applied to the electronic device may be denoted as carrier switch, full user configuration, full customization, or sales code change, but embodiments of the present invention are not limited to the terms.

According to various embodiments of the present invention, when the electronic device performs a carrier switch, a designated application may be installed, and the full configuration of the software configured for a particular carrier may be reflected to the electronic device as, e.g., the network-related configuration, screen configuration, or application configuration is changed. The carrier switch may mean performing the full user configuration function.

According to various embodiments of the present invention, performing control so that a network-related configuration among all of the configurations included in pre-stored software (e.g., carrier A's OMC package) for a particular carrier (e.g., carrier A) are applied to the electronic device may be denoted as network switch, network configuration, network customization, or network code change, but embodiments of the present invention are not limited to the terms.

Hereinafter, although among the enumerated terms, carrier switch or network switch is used in the description of various embodiments of the present invention for ease of description, various embodiments of the present invention are not limited to such a term as set forth above.

According to various embodiments of the present invention, when performing the network switch, the electronic device may perform control so that a predesignated network configuration is applied to the component (e.g., communication circuit, communication processor (CP), or telephony application) performing communication in the electronic device. The network switch may mean performing the network configuration function. When the network switch is performed, the electronic device may selectively change at least part of the full user configuration function which has been changed in the carrier switch.

According to various embodiments of the present invention, various changes may be made to at least one user configuration function configured when the carrier switch or network switch is performed.

According to various embodiments of the present invention, electronic device information may include, e.g., model name, software version information, international mobile station equipment identity (IMEI), and OMC package version information.

According to various embodiments of the present invention, carriers may include communication carriers which provide communication services to the electronic device, account service providers (e.g., Google), or other various service providers.

Now described with reference to the accompanying drawings are an electronic device and a subscriber identity module-based software configuration method in an electronic device according to various embodiments of the present invention. As used herein, the term "user" may denote a human or another device (e.g., an artificial intelligent electronic device) using the electronic device.

FIG. 1 is a view illustrating an example network environment according to various embodiments of the present invention.

Referring to FIG. 1, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, or perform an operation or data processing relating to communication.

The memory 130 may include a volatile or non-volatile memory. For example, the memory 130 may store commands or data related to at least one other component of the electronic device 101. According to an embodiment of the present disclosure, the memory 130 may store software or a program 140. The program 140 may include, e.g., a kernel 141, middleware 143, an application programming interface (API) 145, or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment, the wireless communication may include at least one of, e.g., wireless-fidelity (Wi-Fi), light-fidelity (Li-Fi), Bluetooth, Bluetooth low power (BLE), ZigBee, near-field communication (NFC), magnetic secure transmission (MST), radio frequency (RF), or body area network (BAN) as denoted with element 164 of FIG. 1. According to an embodiment of the disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to various embodiments of the present disclosure, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
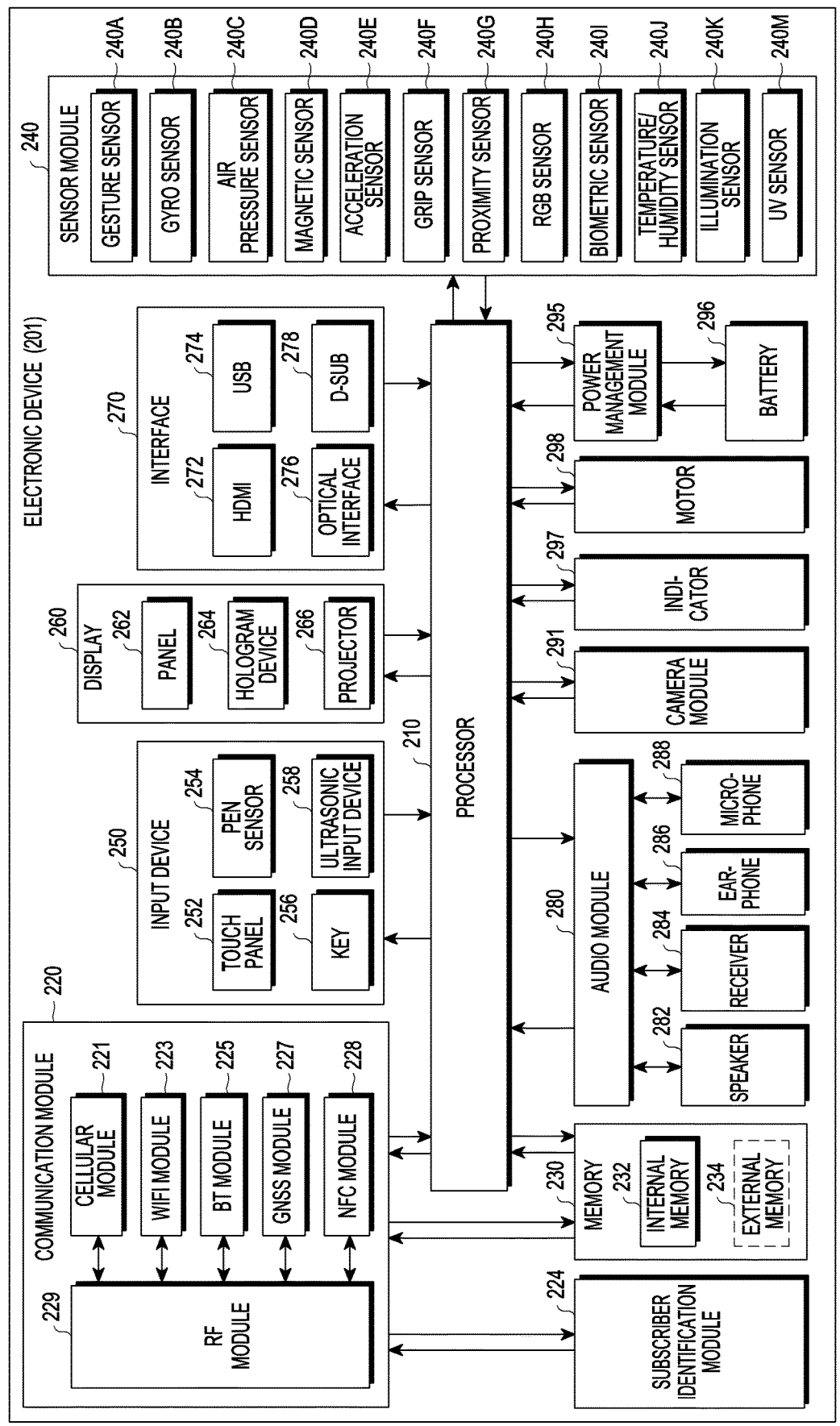
FIG. 2 is a block diagram illustrating an example configuration of an electronic device according to various embodiments of the present invention.

FIG. 2 is a block diagram illustrating an example configuration of an electronic device according to various embodiments of the present invention.

Referring to FIG. 2, the electronic device 201 may include the whole or part of, e.g., the electronic device 101 of FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, or a control circuit for controlling the same. The panel 262 may be implemented to be flexible, transparent, or wearable. The panel 262, together with the touch panel 252, may be configured in one or more modules. According to an embodiment, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment, the power manager module 295 may include a power management Integrated circuit (PMIC), a charger IC, or a battery or fuel gauge. The PMIC may have a wired or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
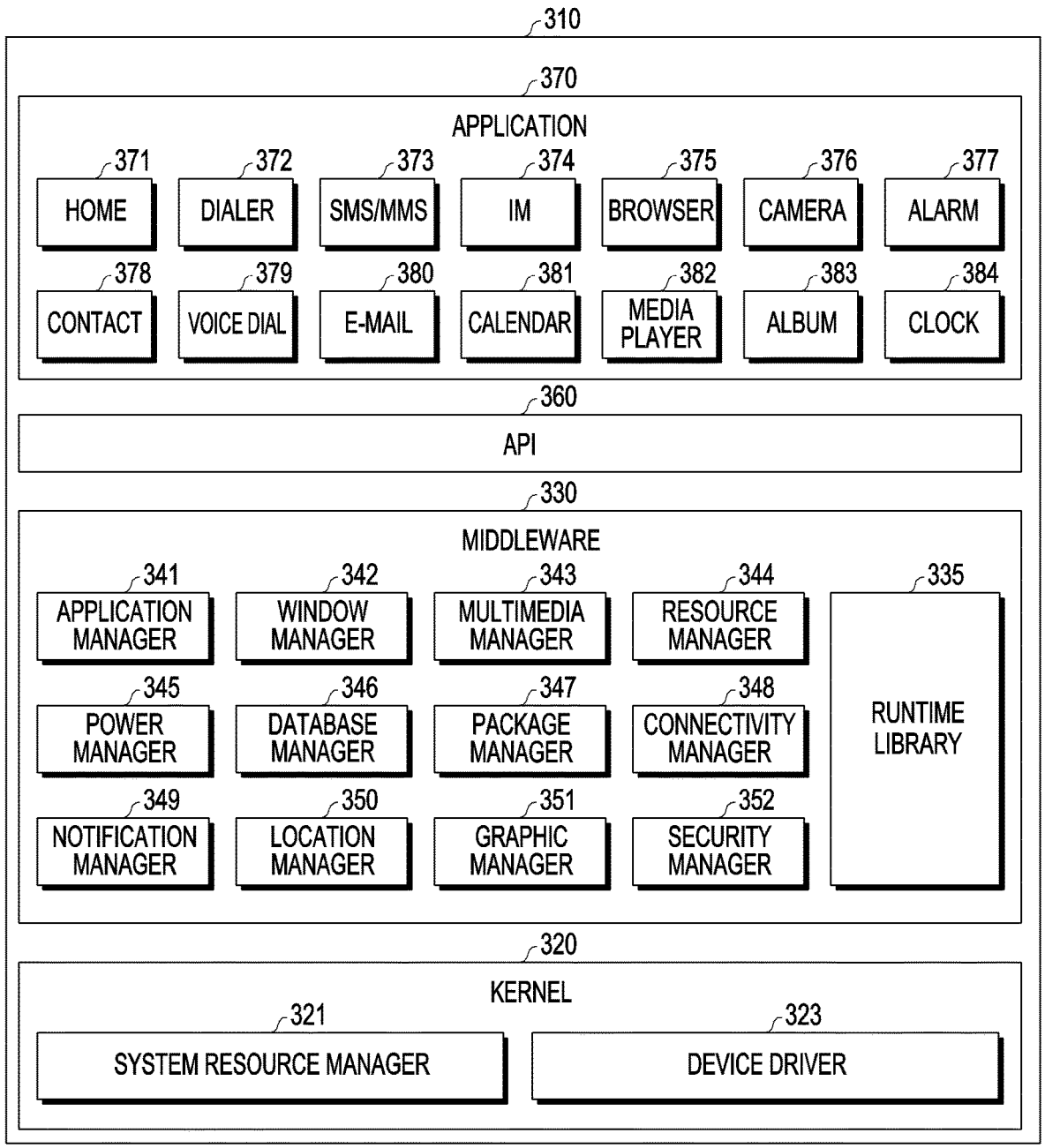
FIG. 3 is a block diagram illustrating an example of a program module configuration according to various embodiments of the present invention.

FIG. 3 is a block diagram illustrating an example of a program module configuration according to various embodiments of the present invention.

According to an embodiment of the present disclosure, the program module 310 (e.g., the program 140) may include an operating system (OS) controlling resources related to the electronic device (e.g., the electronic device 101) or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the capacity, temperature, or power of the battery and determine and provide power information necessary for the operation of the electronic device using a corresponding piece of information of such. According to an embodiment, the power manager 345 may interwork with a basic input/output system (BIOS). The database manager 346 may generate, search, or vary a database to be used in the applications 370. The package manager 347 may manage installation or update of an application that is distributed in the form of a package file. The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment, the middleware 330 may include a telephony manager for managing the voice or video call function of the electronic device or a middleware module able to form a combination of the functions of the above-described elements. According to an embodiment, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, health-care (e.g., measuring the degree of workout or blood sugar), or provision of environmental information (e.g., provision of air pressure, moisture, or temperature information). According to an embodiment, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by another application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment, the application 370 may include an application (e.g., a health-care application of a mobile medical device) designated according to an attribute of the external electronic device. According to an embodiment, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
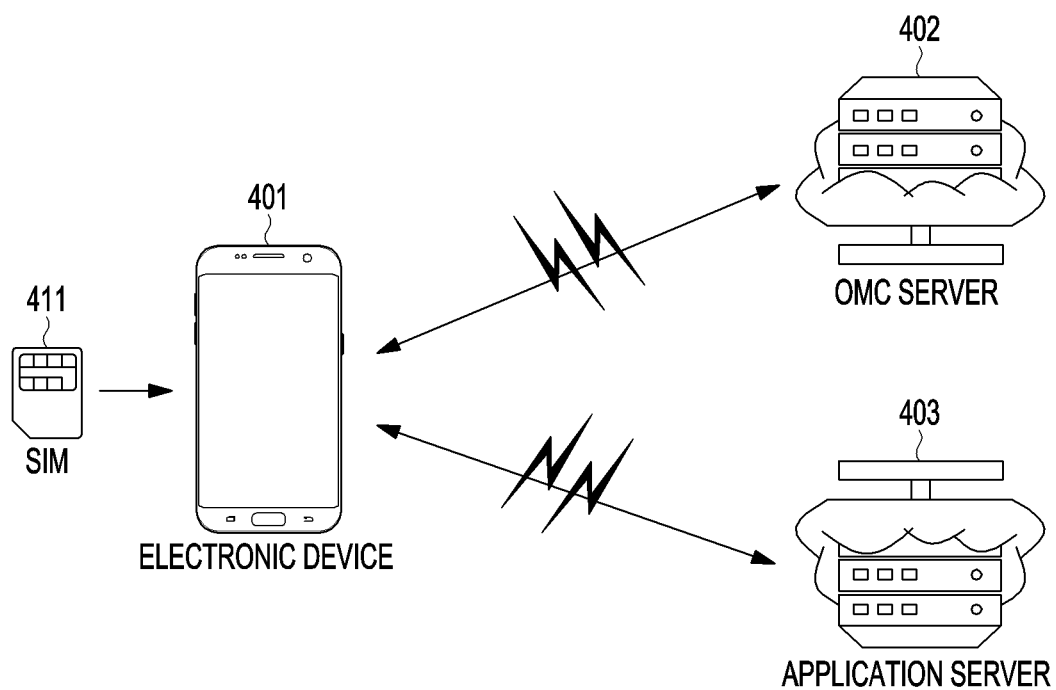
FIG. 4 is a view illustrating an example network environment according to various embodiments of the present invention.

FIG. 4 is a view illustrating an example network environment according to various embodiments of the present invention.

Referring to FIG. 4, a network environment may include an electronic device 401, an OMC server 402, or an application server 403.

The electronic device 401 may identify that an SIM 411 card is inserted for the first time after the factory set step. For example, the electronic device 401 may identify carrier information included in the inserted SIM (411) card, configure predesignated software for the operator information, and apply the software to the electronic device 401.

According to various embodiments of the present invention, although the electronic device has been described as detecting insertion of the SIM as the SIM (411) card is mounted in the electronic device, the SIM may be identified as inserted when a SIM profile (or eSIM profile) wirelessly installed and stored in an eSIM corresponding to the SIM 411 is activated or switched.

According to various embodiments of the present invention, the SIM information may include at least one of the mobile country code (MCC), mobile network code (MNC), mobile subscription identification number (MSIN), mobile station international subscriber directory number (MSISDN), electronic serial numbers (ESN), subscriber identity module (ICCID), service provider name (SPN), group identifier (GID), or IMSI. For example, the electronic device may identify at least one piece of information contained in the SIM and identify that the SIM is inserted into the electronic device.

According to various embodiments of the present invention, after the designated software is applied, the electronic device 401 may update the software. For example, the electronic device 401 may send a request for, or receive, the application or resource updated in relation to the carrier of the SIM 411, to/from at least one server (e.g., the OMC server 402 or the application server 403). For example, in the network environment, the software of the electronic device 401 may be configured by customization via over-the-air (OTA).

According to various embodiments of the present invention, the resources may include data necessary for applying to a particular feature (e.g., the background screen setting or ringtone setting function) of the electronic device, such as the background or ringtone required by the carrier to be configured in the electronic device.

According to various embodiments of the present invention, the OMC server 402 may transmit a list of the applications or resources related to the carrier of the SIM (411) card to the electronic device 401.

According to various embodiments of the present invention, the application server 403 may transmit the resource related to the carrier of the SIM (411) card or the resource included in the resource list received from the OMC server 402 to the electronic device 401. For example, the application server 403 may provide a service related to downloading and installing a particular application or resource so that the application or resource is installed on the electronic device 401.

According to various embodiments of the present invention, the application server 422 may connect to the servers of various carriers to manage the applications related to the corresponding carriers. For example, the applications may include manufacturer applications (e.g., Samsung applications), service applications (e.g., Google applications), and sponsored applications (e.g., Facebook).

According to various embodiments of the present invention, the application server 403 may identify policy information related to the particular application or resource. For example, the policy information may be policy information configured in relation to download and installation and may include information about applications or resources installable necessarily or selectively.

According to various embodiments of the present invention, although the OMC server 402 or the application server 403 is shown as an individual component, at least one of the components may be omitted or changed and may be operated as a single server according to negotiation between the carrier and the manufacturer.

According to various embodiments of the present invention, the OMC server 402 may perform the overall operation for serving the software configuration information-containing package (e.g., OMC package) to the electronic device 401. For example, the OMC server 402 may distribute OMC packages per model or per SIM and manage services, or may perform such operations as releasing, verifying, confirming the equipment of, distributing, or stopping distributing feature information.

According to various embodiments of the present invention, the OMC package may include at least one software function and setting values and, when the OMC package is applied to the electronic device 401, a particular software function in the component or application included in the electronic device 401 may be set to a designated setting value.

The OMC server 402 may transmit the OMC package for each carrier to the electronic device 401. For example, the OMC server 402 may be a server linked to the carrier of the electronic device 401 and may transmit information updated in relation to the software configuration of the OMC package to the electronic device 401.

According to various embodiments of the present invention, the electronic device 401 may download the application or resource from the OMC server 402 or the application server 403 and install it on the electronic device 401. For example, if the installation of the application or resource is complete, the electronic device 401 may reboot.

Figure 5:
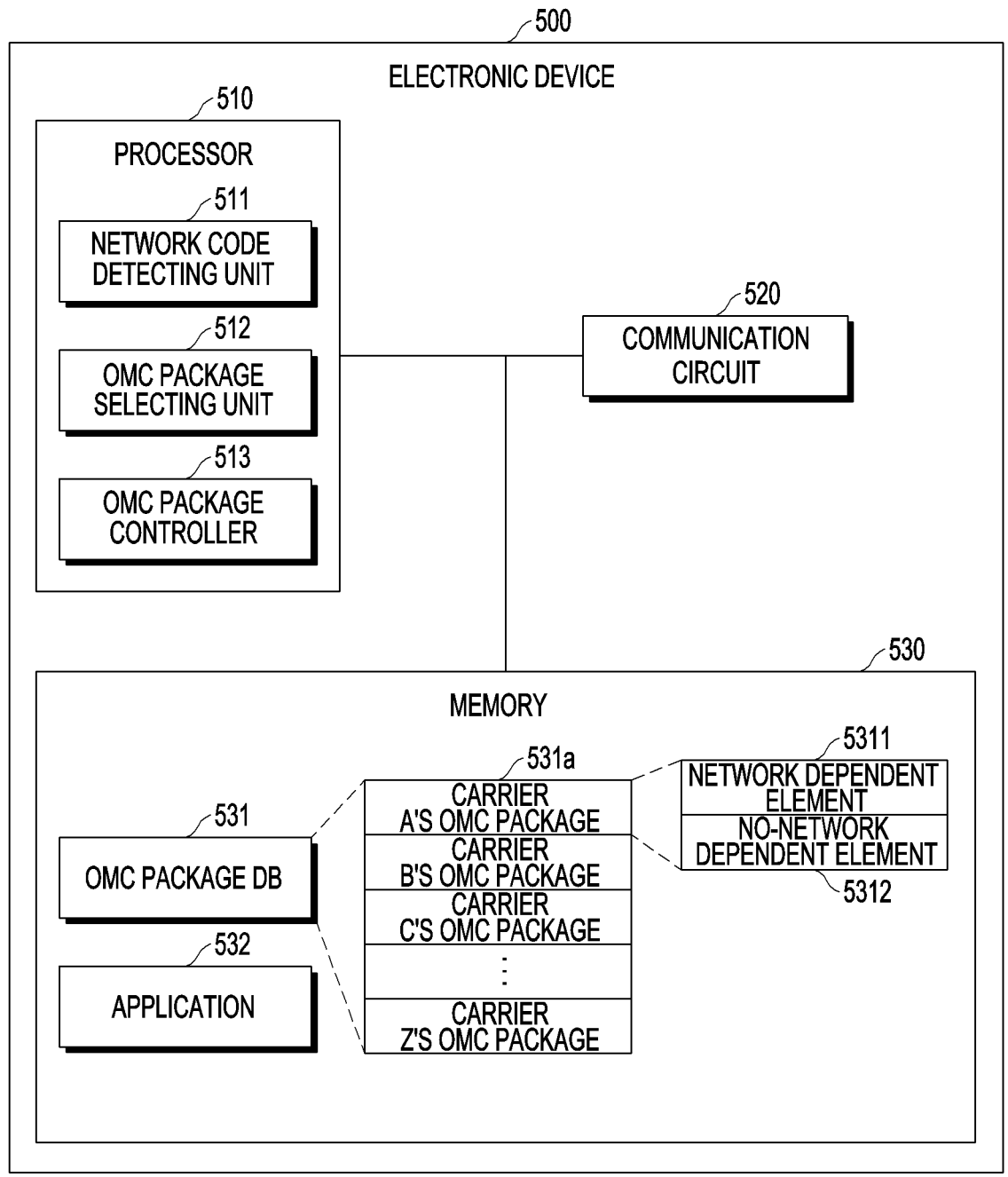
FIG. 5 is a block diagram illustrating an example configuration of an electronic device according to various embodiments of the present invention.

FIG. 5 is a block diagram illustrating an example configuration of an electronic device according to various embodiments of the present invention.

Referring to FIG. 5, an electronic device 500 may include a processor 510, a communication circuit 520, or a memory 520.

The processor 510 may include a network code detecting unit 511, an OMC package selecting unit 512, or an OMC package controller 513 and, as an instruction set or code stored in the memory 530, there may be instructions/code resided in the processor 510 at least temporarily, a storage space storing instructions/code, or part of circuitry constituting the processor 510.

The operation of the components 511, 512, and 513 of the processor 510 described below may be appreciated as the operation of the processor 501. For example, some of the components may be modified or omitted in which case the operation of a corresponding component may be performed by the processor 510.

According to various embodiments of the present invention, the processor 510 may perform the overall operation for receiving the OMC service. For example, the processor 510 may identify the OMC package related to the recognized SIM in the electronic device 500 among the stored OMC packages and apply at least part of the software configuration included in the identified OMC package to the electronic device 500.

The network code detecting unit 511, if the SIM is recognized in the electronic device 500, may detect the network code corresponding to the information about the carrier of the recognized SIM.

According to various embodiments of the present invention, the OMC package selecting unit 512 may determine the carrier based on the public land mobile network (PLMN) value included in the IMSI of the SIM and select the OMC package corresponding to the sales code of the determined carrier among the stored OMC packages.

The OMC package controller 513 may perform control so that the software configuration included in the selected OMC package is applied and operated in the electronic device 500. For example, the OMC package controller 513 may install a designated application or resource on the electronic device 500 based on the software configuration and perform control so that the network configuration is configured in the communication circuit 520 or a particular application.

According to various embodiments of the present invention, the OMC package controller 513, when the SIM is recognized, may perform the full user configuration for applying the overall software configuration included in the selected OMC package to the electronic device 500 or the network code for applying the network-related configuration of the software configuration to the electronic device 500 according to reception of a designated user input or when the SIM is recognized for the first time (or after the factory set step).

According to various embodiments of the present invention, when the full user configuration is performed, the OMC package controller 513 may change the plurality of CSCs stored in the electronic device 500 into the CSC value corresponding to the sales code of the recognized SIM or download the application or resource (e.g., wall paper or ringtone) designated in the OMC package from a server (e.g., the OMC server 402 or application server 403 of FIG. 4) and install the downloaded application or resource.

According to various embodiments of the present invention, the OMC package controller 513, when the network configuration is performed, may set the network configuration (e.g., access point name (APN) or voice over LTE (VoLTE) function) for the communication circuit 520 or a particular application to the setting value included in the network dependent element of the selected OMC package. For example, when the network configuration is performed, the electronic device 500 may reboot according to the platform of the communication circuit 520 or the processor 510.

The communication circuit 520 may receive OMC packages for various carriers from at least one server (e.g., the OMC server 402 or the application server 403 of FIG. 4) and, as a particular OMC package applies to the electronic device 500, may download the particular application or resource configured in the OMC package.

The memory 530 may store an OMC package database (DB) 531 or an application 532.

According to various embodiments of the present invention, the OMC package DB 531 may store information about each carrier's OMC package. For example, the information about the carrier's OMC package may be previously equipped when manufactured or may be information received from an OMC server (e.g., the OMC server 402 of FIG. 4).

According to various embodiments of the present invention, the OMC package may include software configuration and each software configuration's setting value. For example, the software configuration may include at least some of the SIM card information, default setting value for application, sound, connection profiles, messages (e.g., SMS or MMS), mobile hotspot, Wi-Fi, browsers, Bluetooth, GPS, NFC, video call, internet protocol multimedia subsystem (IMS), radio interface layer (RIL), and call configurations and may further include various software configurations that may be made in the electronic device 500.

According to various embodiments of the present invention, the SIM card information may include SIM-related setting values such as the MCC, MNC, and GID.

The default setting value for application may include a setting value for a contacts application, phone application, email application, or other installed application.

The sound may include setting values for various sounds output from the electronic device 500, such as message tones or connection tones.

The connection profiles may include the internet protocol (IP) protocol version, default URL, proxy, port number, or other communication connection-related setting values.

The message may include message-related setting values, such as the number of maximum recipients, the maximum size of message which may be transmitted or received, user agent, or UA profile uniform resource locator (URL).

The mobile hot spot may include setting values for mobile hotspot connection, such as provision applications or HAC.

The Wi-Fi may include setting values for Wi-Fi connection, such as automated connection or default SSID.

The browser may include browser-related setting values, such as customization of error pages or homepage URL.

The Bluetooth may include setting values for Bluetooth connection, such as the network access provider (NAP) or service access point (SAP).

The GPS may include setting values for performing GPS, such as assisted GPS (A-GPS) or LTE positioning protocol (LPP).

The NFC may include setting values for NFC connection, such as card mode configuration or universal IC card mode (UICC) card mode.

The video call may include setting values for video calls such as bearer or capability.

The IMS may include IMS-related setting values, such as the network name, version (e.g., 3.0), software platform, IMS enable/disable value, IMS enable/disable value in a particular communication scheme (e.g., LTE, VoLTE, or Wi-Fi), SMS enable/disable value via IP, RCS enable/disable value, or IPME.

The RIL may include wireless communication-related setting values, such as IMEI or voice priority.

The phone may include setting values related to the screen configuration of the phone application, such as style for HD icon or phone buttons.

According to various embodiments of the present invention, the software configuration included in the OMC package may include a network dependent element related to the network configuration and a non-network dependent element irrelevant to the network configuration. The network dependent element may include a communication processor (CP) (or a communication circuit 520) configuration element performing data communication in the electronic device 500. For example, the network dependent element, the non-network dependent element, and the CP configuration element may be extensible markup language (xml)-format files and may respectively be stored in a 'cscfeature_network.xml' file, a 'cscfeature.xml' file, and a 'cp.xml' file, or may be stored in other various file formats or file names.

According to various embodiments of the present invention, the network dependent element may include files (carrier feature files) including the features related to the carrier applied temporarily or permanently and files (carrier setting files) in which setting values (carrier setting values) for setting carrier-related features are set. For example, the network dependent element may include settings including network-related setting values, such as the connection profile, mobile hotspot, video call, or IMS, of the software configuration of the OMC package.

According to various embodiments of the present invention, the non-network dependent element may include at least one piece of information among OMC package information, such as version or model name, application information including a list of applications needed to be previously downloaded or installed, and home screen configuration information including icons, widgets, or folder layouts and may further include various pieces of information for downloading and installing OMC-related information.

According to various embodiments of the present invention, the CP configuration element may include IMEI software version (SVN) information, whether the dual transfer mode (DTM) function is supported, whether a particular function is supported in radio resource control (RRC), and setting values related to setting a high speed downlink packet access (HSDPA) category version and may further include other various pieces of information for setting the communication circuit 520 (e.g., the communication interface 170 or the communication module 220) of the electronic device 500 (or the electronic device 101 or the electronic device 201). The CP configuration element may include various pieces of information for performing data communication, such as applicable network types (e.g., the GSM, GPRS, UMTS, HSPA, LTE, or CDMA), supportable category information when applicable to LTE, and whether IPv6 is supported.

According to various embodiments of the present invention, although the CP configuration element has been described as included in the OMC package, the processor 510 may perform control to receive the same upon performing the full user configuration function or the network user configuration function via a server (e.g., the OMC server 402 of FIG. 4) or to update changed information.

According to various embodiments of the present invention, when the network user configuration function is performed, if carrier B's SIM is recognized after carrier A's SIM is removed, the processor 510 may configure an OMC package including a network dependent element including carrier B's CP configuration element and carrier A's non-network dependent element. For example, the processor 510 may perform control to transfer the CP configuration element to the communication circuit 520 so that the configuration of the communication circuit 520 is varied.

According to various embodiments of the present invention, the OMC package 500 may be stored in a compressed file format (e.g., '.zip') to have the minimum volume for downloading and installing OMC-related information.

According to various embodiments of the present invention, each element (e.g., the network dependent element or non-network dependent element) of the OMC package 500 may be saved in the '.xml' file format.

The function information (e.g., 'others.xml') may include setting value information for features required to be checked for a particular operation when the particular operation is performed in the electronic device 500. The application information (e.g., 'apps.xml') may include information related to an application to be downloaded. For example, the application-related information may include information about the server from which the application is retrieved, feature value information necessary for installation, or information indicating how to install (e.g., mandatory or optional installation). The resource information (e.g., 'resource.xml') may include information related to resources to be downloaded. For example, the resource-related information may include information about the server from which the resource is retrieved, feature value information necessary for installation, or information indicating whether the resource is installed on the electronic device mandatorily or optionally.

The processor 510 may control various OMC services for applying the software published for open markets to the electronic device 500. For example, the processor 510 may perform control to register the electronic device 500 in the OMC server and download software-related features or applications.

According to various embodiments of the present invention, the processor 510 may apply per-carrier software configurations or identify software configuration-related information (e.g., OMC package) stored in the memory 530, thereby updating the software configuration for at least one SIM (or at least one carrier).

According to various embodiments of the present invention, the processor 510 may perform control so that the software configuration information included in the OMC package is applied to the electronic device 500 according to the SIM recognition status (e.g., an SIM change or recognition of a plurality of SIMs).

According to various embodiments of the present invention, when a plurality of SIMs are recognized, the processor 510 may identify information about an OMC package applicable to the plurality of SIMs among a plurality of OMC packages previously stored and perform control so that the identified OMC package is applied to the electronic device 500. For example, the processor 510 may change some features of the prior OMC package applied to the electronic device 500 or change the prior OMC package into a new OMC package and apply the same to the electronic device 500.

According to various embodiments of the present invention, if a plurality of SIMs is recognized, the processor 510 may apply a first OMC package for a first SIM, recognized first, to the electronic device 500 and apply a second OMC package for a second SIM, recognized later, to the electronic device 500. For example, if a plurality of SIMs is recognized, after the software configuration included in the first OMC package is applied and the application or resource is downloaded, the software configuration included in the second OMC package may be applied to the electronic device 500.

According to various embodiments of the present invention, if the recognized SIM is one into which the prior recognized SIM has been changed, the processor 510 may identify OMC package information for the changed SIM via the server (e.g., the OMC service server 221) and apply the identified OMC package to the electronic device 500. For example, if the OMC package information for the changed SIM is not stored in the memory 500, the processor 510 may perform control to receive the OMC package from the server.

The memory 500 may store configuration information about default software set by the manufacturer or feature information generated by the server. For example, the feature information may include information about the application or resource to be downloaded or setting a particular function of the electronic device 500 by the manufacturer.

According to various embodiments of the present invention, an electronic device 500 comprises a communication circuit 520 configured to transmit and receive data based on at least one piece of network information, a processor 510, and a memory 530, wherein the memory 530 may store instructions configured to, when executed, enable the processor 510 to install first configuration information (e.g., carrier A's OMC package 531a) corresponding to a first communication network operator among a plurality of communication network operators as a first subscriber identity module including information about the first communication network operator is recognized in the electronic device, identify a non-network dependent element of carrier B's OMC package corresponding to a second communication network operator among the plurality of communication network operators as a second subscriber identity module including information (e.g., carrier B's OMC package) about the second communication network operator is recognized in the electronic device, and configure a network of the electronic device based on the non-network dependent element of carrier B's OMC package and a network dependent element 5311 included in the first configuration information.

According to various embodiments of the present invention, the instructions may be configured to enable the processor 510 to identify configuration information about the plurality of communication network operators and store, in the memory 530, the configuration information, with the configuration information divided into network configuration information for configuring the network of the electronic device and non-network configuration information for configuring a function other than the network.

According to various embodiments of the present invention, the instructions may be configured to enable the processor 510 to, upon identifying that the second subscriber identity module is recognized in the electronic device, output a screen for identifying whether to install the whole second configuration information corresponding to the second communication network operator and control the electronic device based on the second configuration information according to an input received on the screen.

According to various embodiments of the present invention, the instructions may be configured to enable the processor to, upon identifying that a plurality of subscriber identity modules is recognized, output a screen for receiving selection of one of the plurality of subscriber identity modules and control the network of the electronic device based on third network configuration information about a third subscriber identity module selected from among the plurality of subscriber identity modules according to an input received on the screen.

According to various embodiments of the present invention, the instructions may be configured to enable the processor 510 to identify the second configuration information corresponding to the second subscriber identity module upon identifying that the second subscriber identity module is recognized as the first subscriber identity module is removed and control the communication circuit 520 or a network-related application stored in the memory 530 based on the second configuration information and first non-network configuration information of the first configuration information.

According to various embodiments of the present invention, the instructions may be configured to enable the processor 510 to install a designated application or resource based on the first non-network configuration information of the first configuration information.

According to various embodiments of the present invention, the instructions may be configured to enable the processor 510 to configure a screen of the application based on the first non-network configuration information, for a network-related application among applications stored in the memory 530 and control a function performed using the communication circuit 520 among functions of the network-related application based on the second network configuration information.

According to various embodiments of the present invention, the instructions may be configured to enable the processor 510 to receive configuration information about the plurality of communication network operators from a server through the communication circuit 520.

According to various embodiments of the present invention, the instructions may be configured to enable the processor 510 to transfer the second network configuration information to the communication circuit 520 so that the network of the electronic device is configured based on the second network configuration information.

According to various embodiments of the present invention, the instructions may be configured to enable the processor 510 to install, on the electronic device, an OMC package based on the second network configuration information and the first non-network configuration information included in the first configuration information.

Figure 6:
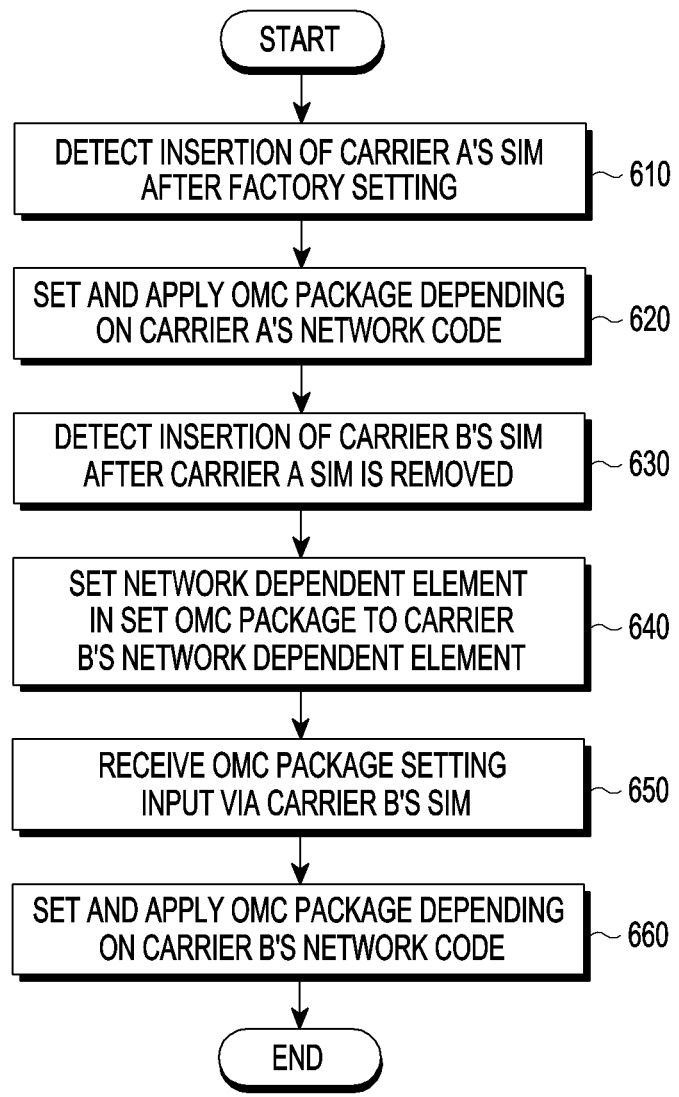
FIG. 6 is a flowchart illustrating an example operation of configuring software as a SIM is recognized and changed in an electronic device according to various embodiments of the present invention.

FIG. 6 is a flowchart illustrating an example operation of configuring software as a SIM is recognized and changed in an electronic device according to various embodiments of the present invention. According to various embodiments of the present invention, operations 610 to 660 may be performed by any one of the electronic device 101, 201, 401, or 500, the processor 120, 210, or 510, or the program module 310.

Referring to FIG. 6, in operation 610, the electronic device 500, according to various embodiments of the present invention, may detect recognition of carrier A's SIM after factory setting is performed. For example, a sales code may be set in carrier A's SIM.

In operation 620, the electronic device 500 according to various embodiments of the present invention may set an OMC package according to carrier A's network code corresponding to carrier A's SIM and apply the OMC package to the electronic device. For example, the electronic device may identify the OMC package corresponding to carrier A's network code among carriers' OMC packages previously stored and apply the identified OMC package to the electronic device.

According to various embodiments of the present invention, the OMC package may include network dependent elements and non-network dependent elements. For example, the electronic device may apply the network dependent elements to functions related to the communication circuit (or communication processor (CP)) of the electronic device and the non-network dependent elements to the other elements (e.g., the processor, application or framework) than the communication circuit.

In operation 630, the electronic device may recognize carrier B's SIM after carrier A's SIM is removed.

In operation 640, the electronic device may set the network dependent elements in the applied OMC package as carrier B's network dependent elements and apply the same to the electronic device.

According to various embodiments of the present invention, the electronic device may identify carrier B's network code corresponding to carrier B's SIM and identify the network dependent elements in carrier B's OMC package previously stored. The electronic device may set the network dependent elements in the applied OMC package as carrier B's network dependent elements identified and apply the same to the electronic device.

In operation 650, the electronic device may receive an input for setting the OMC package with carrier B's SIM.

According to various embodiments of the present invention, the electronic device may display a menu or user interface screen for identifying whether to set the full OMC package or only network dependent elements using carrier B's SIM. For example, the electronic device may receive an input for setting the full OMC package for carrier B via the menu or user interface screen from the user.

In operation 660, the electronic device may set the OMC package according to carrier B's network code and apply the same to the electronic device. For example, the electronic device may identify the OMC package for carrier B among OMC packages previously stored and apply the network dependent elements and non-network dependent elements included in the OMC package for carrier B to the electronic device.

Figure 7:
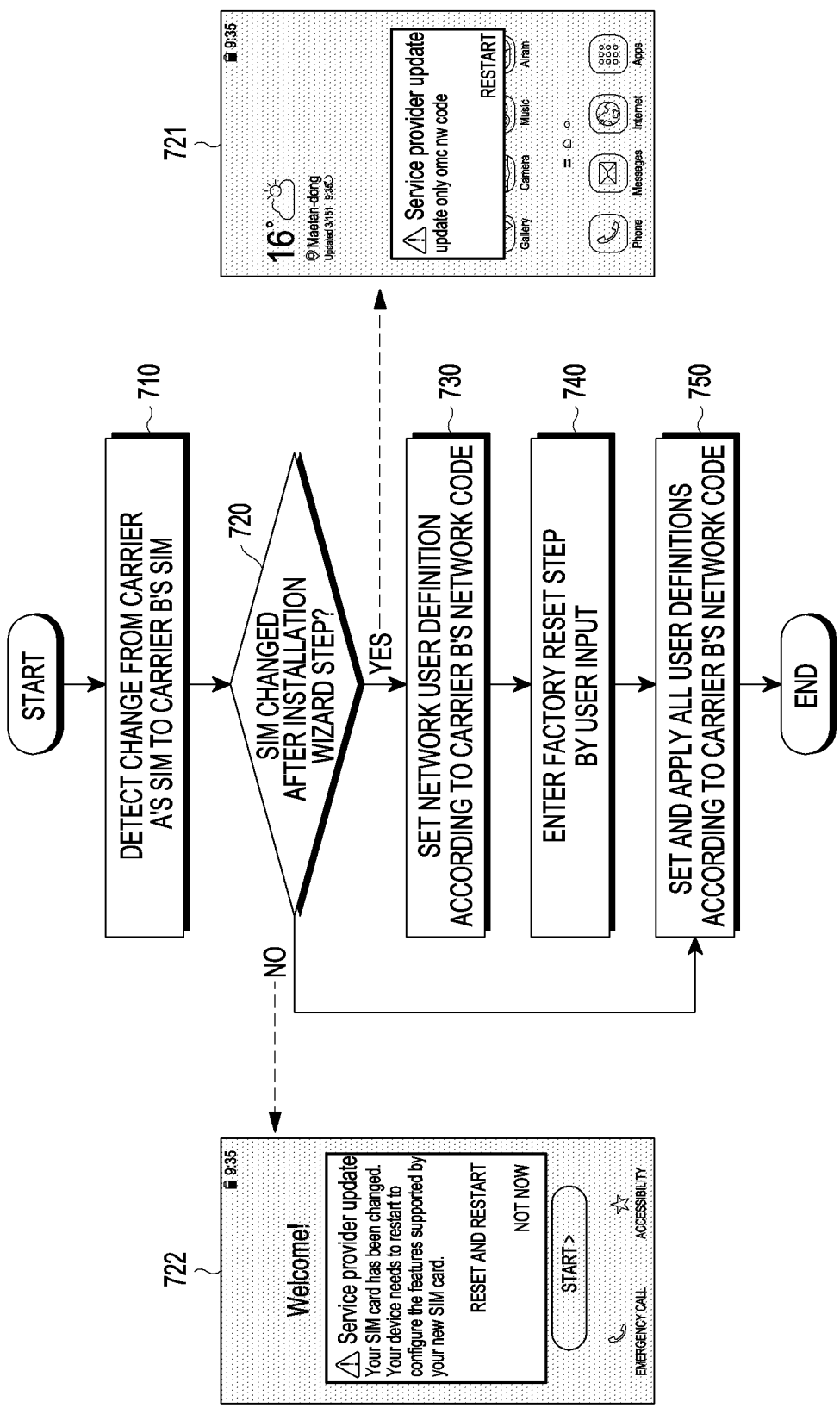
FIG. 7 is a flowchart illustrating an example operation of configuring software as a SIM is recognized and changed in an electronic device according to various embodiments of the present invention.

FIG. 7 is a flowchart illustrating an example operation of configuring software as an SIM is recognized and changed in an electronic device according to various embodiments of the present invention.

According to various embodiments of the present invention, as the SIM which is of a card type is mounted in the electronic device or a particular SIM profile in a pre-attached eSIM is activated, the electronic device may identify that the SIM has been inserted.

According to various embodiments of the present invention, operations 710 to 750 may be performed by any one of the electronic device 101, 201, 401, or 500, the processor 120, 210, or 510, or the program module 310.

Referring to FIG. 7, in operation 710, the electronic device 500 may detect a change from carrier A's SIM to carrier B's SIM. For example, in the electronic device, carrier A's SIM is first recognized and then removed, and carrier B's SIM may be recognized.

In operation 720, after an installation wizard is fulfilled, the electronic device may identify whether a change is made from carrier A's SIM to carrier B's SIM which is then recognized.

If carrier B's SIM is recognized after performing the installation wizard operation in which the full OMC package for carrier A's SIM is applied as a result of operation 720, the electronic device may perform the network user configuration function according to carrier B's network code corresponding to carrier B's SIM in operation 730.

According to various embodiments of the present invention, in the network user configuration function, a change may be made only to the network dependent elements in the OMC package which are then applied to the electronic device, and the network-related configuration may be set according to the network dependent elements included in carrier B's OMC package.

According to various embodiments of the present invention, when the network user configuration function is performed, user data and carrier data (e.g., applications or resources) of the OMC package for carrier A's SIM installed on the electronic device are not deleted but, as carrier B's network dependent elements are set, network-related data of the OMC package for carrier A's SIM may be deleted.

According to various embodiments of the present invention, if carrier B's SIM is recognized after the installation wizard operation for carrier A's SIM is performed, the electronic device may display a screen 721 for indicating that the network user configuration function is performed. The screen 721 may include content indicating that as the SIM is changed, the network user configuration function of the electronic device is performed in relation to the changed SIM, and the electronic device needs to be restarted and a restart button.

According to various embodiments of the present invention, a progress bar to apply settings related to the changed SIM without restart and indicate the status of applying the settings may be displayed in a pop-up window on the screen 721.

In operation 740, the electronic device may enter a factory set step by a user input. For example, as a particular input is received, the electronic device may perform the factory set step to initialize the OMC package applied to the electronic device.

If carrier B's SIM is recognized or the above-described operation 740 is performed while the installation wizard operation in which the full OMC package for carrier A's SIM is applied is performed as a result of operation 720, the electronic device may perform the full user configuration function according to carrier B's network code in operation 750.

According to various embodiments of the present invention, if carrier B's SIM is recognized while the installation wizard operation for carrier A's SIM is performed, the electronic device may display a screen 722 of performing the full user configuration function. The screen may include content indicating that as the SIM is changed, the full user configuration function of the electronic device is performed in relation to the changed SIM, and the electronic device needs to be restarted and buttons. The buttons may include a button (reset and restart) for performing reset and restart or a button (not now) for performing reset and restart later.

According to various embodiments of the present invention, the full user configuration function may change both the network dependent elements and the non-network dependent elements of the OMC package and apply the same to the electronic device. All software configurations included in carrier B's OMC package may be applied to each element of the electronic device.

Figure 8:
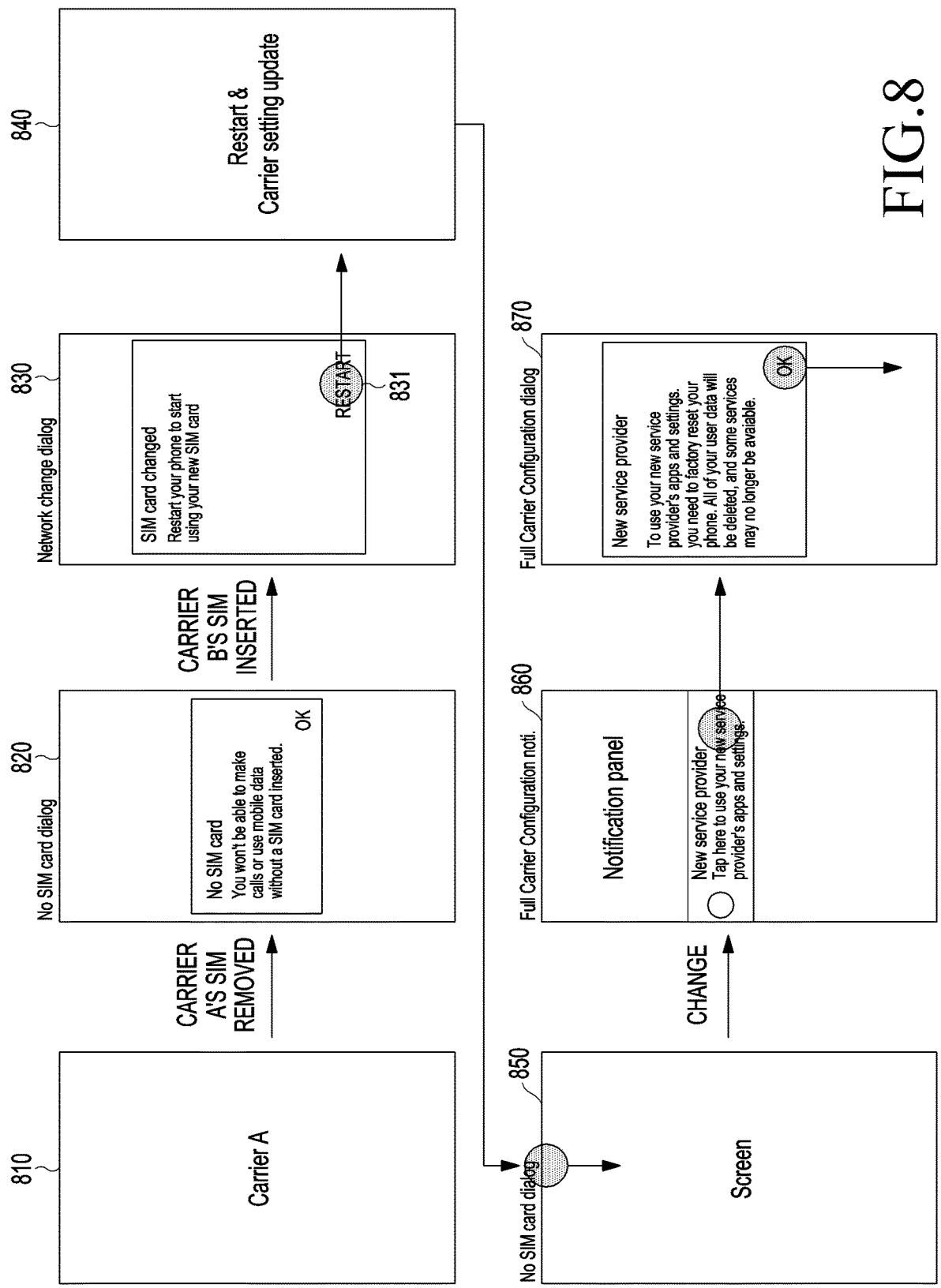
FIG. 8 is a view illustrating an example screen configuration for applying a software configuration as a SIM is changed in an electronic device according to various embodiments of the present invention.

FIG. 8 is a view illustrating an example screen configuration for applying a software configuration as a SIM is changed in an electronic device according to various embodiments of the present invention.

Referring to FIG. 8, an electronic device may output a screen 810 to indicate that carrier A's SIM is recognized and default software is mounted.

According to various embodiments of the present invention, if carrier A's SIM is removed, the electronic device may output a screen 820 indicating that mobile data is unavailable as the SIM has been removed.

According to various embodiments of the present invention, if carrier B's SIM is recognized after carrier A's SIM is removed, the electronic device may output a screen 830 including content to indicate that the network user configuration function is performed by carrier B's SIM and the electronic device needs to restart and a restart button 831.

According to various embodiments of the present invention, if the network user configuration function is performed when a change is made from carrier A's SIM to carrier B's SIM which is then recognized, a change may be made to the settings for performing data communication over carrier B's network, such as network mode for the communication circuit or processor of the electronic device, APN information, or VoLTE settings.

According to various embodiments of the present invention, if the restart button 831 is selected from the screen 830, the electronic device may output a screen 840 to indicate restart and an update of settings related to carrier B and that the restart and update are in progress.

According to various embodiments of the present invention, after the restart and update are performed, a screen 850 may be output to indicate that the SIM card is unidentifiable. For example, the screen 850 may be displayed when the SIM is recognized but the carrier of the recognized SIM is not identifiable.

According to various embodiments of the present invention, upon receiving a gesture input from up to down on the screen 850, the electronic device may display a notification panel 870 including a message indicating that the full user configuration function is performed in relation to carrier B's SIM.

According to various embodiments of the present invention, if the message on the notification panel 870 is selected, the electronic device may include content indicating that the full user configuration function of the electronic device has been performed with carrier B's SIM and that the factory set step needs to be performed and an 'OK' button. For example, if the 'OK' button is selected, the electronic device may restart and perform the full user configuration function of the electronic device with carrier B's SIM.

According to various embodiments of the present invention, although an example in which the notification panel 870 displays the 'OK' button has been described, a 'CANCEL' button may be displayed alternatively or additionally. For example, if the 'CANCEL' button is selected, the electronic device may determine that the content displayed on the notification panel 870 is not agreed to.

According to various embodiments of the present invention, although an example has been described in which as the 'OK' button is selected, the electronic device restarts, the electronic device may be configured to display a selection item for selecting a time or particular module and restart only at the selected time or only for the selected module.

Figure 9:
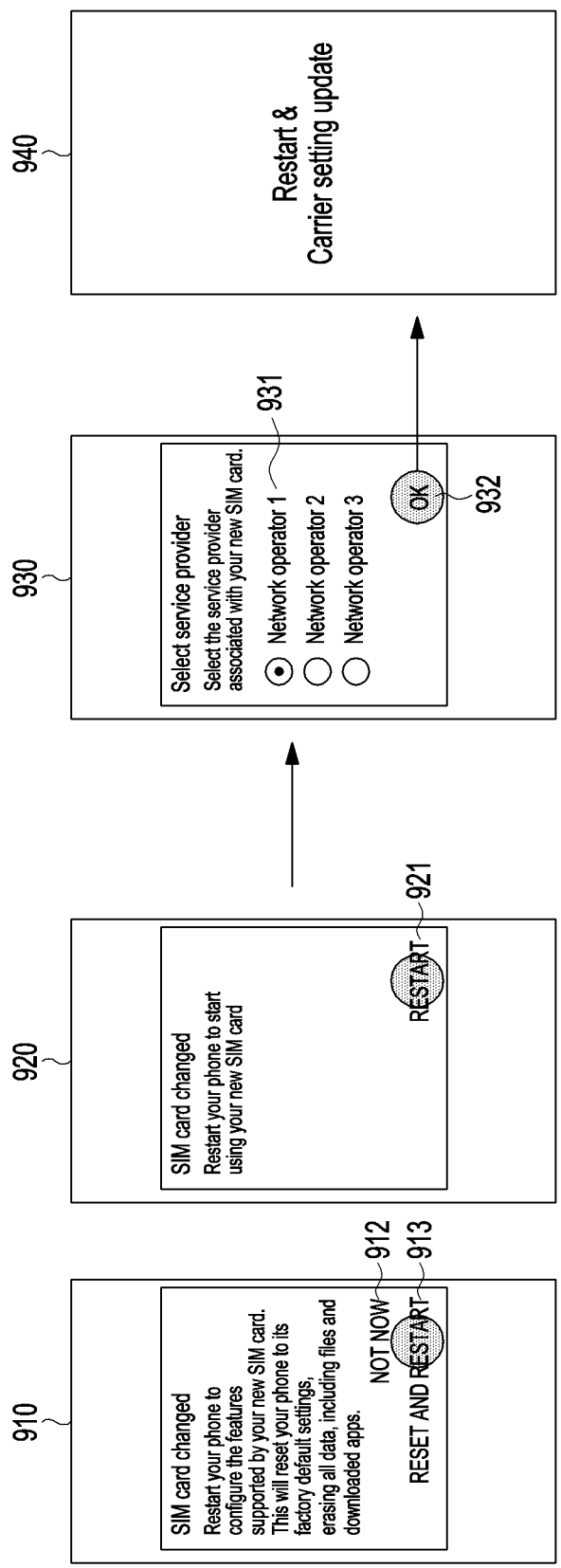
FIG. 9 is a view illustrating an example screen configuration for selecting a carrier and applying a software configuration as a SIM including a plurality of CSCs is recognized in an electronic device according to various embodiments of the present invention.

FIG. 9 is a view illustrating an example screen configuration for selecting a carrier and applying a software configuration as a SIM including a plurality of CSCs is recognized in an electronic device according to various embodiments of the present invention.

Referring to FIG. 9, if the SIM is recognized and removed, then a new SIM is recognized, the electronic device may output a screen (e.g., 910 or 920) including content indicating that reset and restart are required and buttons. For example, the screen may be configured in various forms, such as a screen 910 including a button 910 for performing reset and restart and a button 913 for performing reset and restart or a screen 920 including a button 921 for performing restart alone.

According to various embodiments of the present invention, as the reset and restart button 913 or the restart button 921 is selected on the screen 910 or 920, the electronic device may output a screen 930 for selecting a carrier.

According to various embodiments of the present invention, when a plurality of CSCs is identified in relation to the recognized SIM among CSCs stored, the electronic device may output a screen 930 for identifying a selection input for one of the plurality of CSCs. The cases where the plurality of CSCs is identified may include when carrier A rents carrier B's communication network or shares part of the communication network and, when carrier A's SIM or carrier B's SIM is recognized, the CSC related to the other carrier may be identified.

According to various embodiments of the present invention, if an 'OK' button 932 is selected after a particular carrier (network operator 1) 931 is selected on the screen 930, the electronic device may perform the network configuration related to network operator 1 and reboot. For example, the electronic device may output a screen 940 to indicate that rebooting and network configuration are performed.

Figure 10:
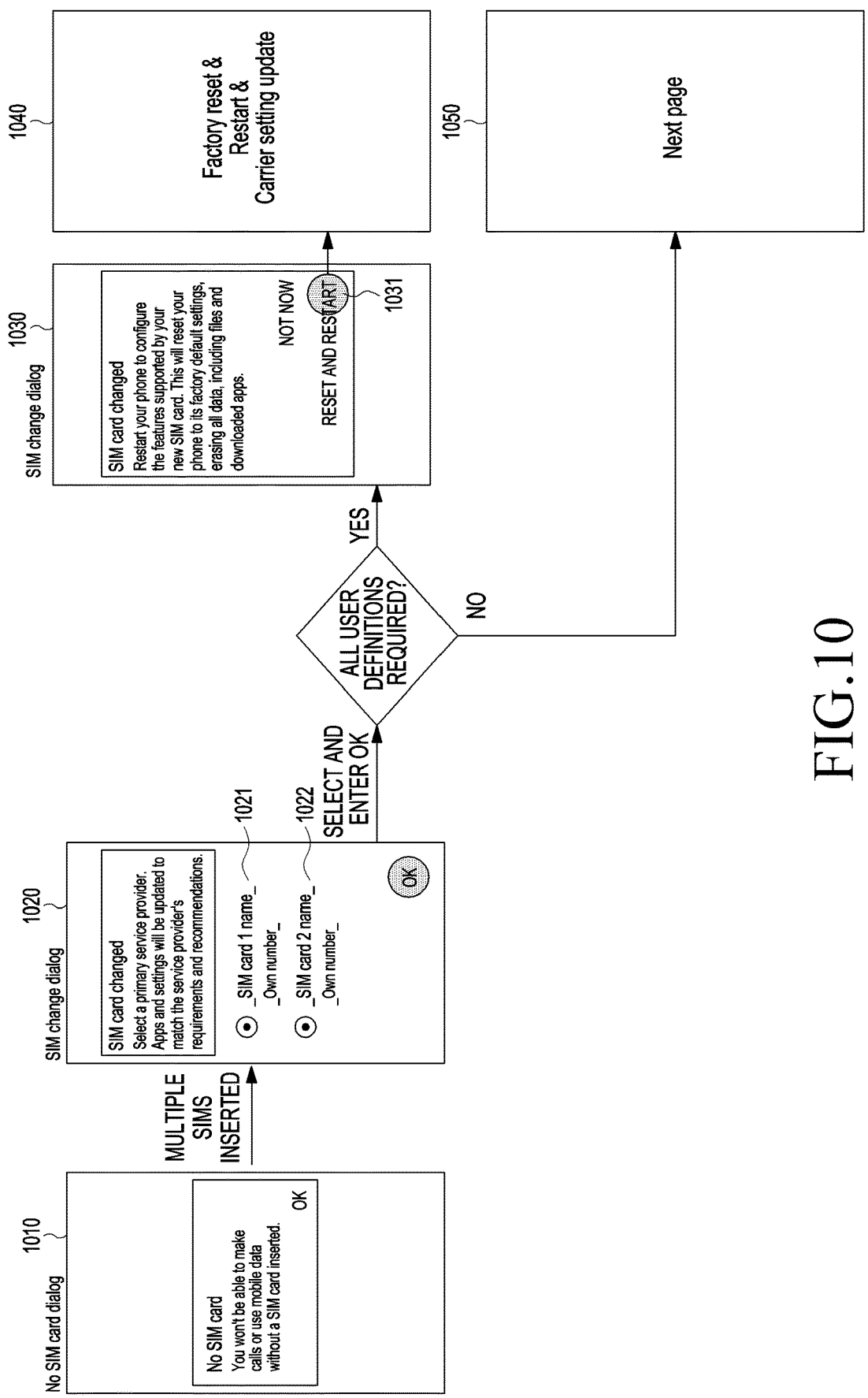
FIG. 10 is a view illustrating an example screen configuration for applying a software configuration as a plurality of SIMs is recognized in an electronic device according to various embodiments of the present invention.

FIG. 10 is a view illustrating an example screen configuration for applying a software configuration as a plurality of SIMs is recognized in an electronic device according to various embodiments of the present invention.

According to various embodiments of the present invention, as a plurality of SIM cards is mounted in an electronic device or a plurality of SIM profiles in an eSIM is activated, the electronic device may recognize the plurality of SIMs.

Referring to FIG. 10, in a case where no SIM is recognized when the electronic device boots up after the factory set step, the electronic device may output a screen 1010 including a message for requesting to activate an eSIM profile or to insert a SIM card.

According to various embodiments of the present invention, if a plurality of SIMs (e.g., a first SIM and a second SIM) is recognized, and an 'OK' button is selected on the screen 1010, the electronic device may request to identify selection of an SIM for configuring default software among the plurality of SIMs. For example, the electronic device may output a screen 1020 including an 'OK' button and a selection item for selecting one of the plurality of recognized SIMs.

According to various embodiments of the present invention, the electronic device may identify a selection input for the 'OK' button and a particular SIM on the screen 1020. For example, upon identifying selection of a selected SIM (e.g., carrier A's first SIM), the electronic device may perform control so that software related to the first SIM among pieces of software previously stored is applied to the electronic device.

According to various embodiments of the present invention, the electronic device may determine whether to perform the full user configuration function of the electronic device in relation to the selected SIM. For example, the electronic device may perform control to perform the full user configuration function with the software of the selected SIM when the plurality of SIMs is recognized in an out-of-box (OOB) status and to apply part (e.g., network configuration) of the software of the selected SIM to the electronic device when the plurality of SIMs is recognized in a status other than the OOB status.

According to various embodiments of the present invention, although an example has been described in which it is determined whether the full user configuration function needs to be performed depending on the status of the electronic device when the SIMs are recognized, determination of whether the full user configuration function needs to be performed may be performed as a designated input to various programs or menus is received.

According to various embodiments of the present invention, when the full user configuration function needs to be performed, the electronic device may output a screen 1030 to indicate that the overall software configuration related to the selected SIM is applied to the electronic device. For example, the OOB status may include when the electronic device is first activated so that the SIM is recognized for the first time or the default settings are identified.

According to various embodiments of the present invention, the screen 1030 may include buttons and content indicating that software related to the selected SIM is applied to the electronic device. For example, the buttons may include a reset and restart button 1031 for applying the software to the electronic device and a button for performing control so that reset and restart are performed later.

According to various embodiments of the present invention, if the reset and restart button 1031 is selected, the electronic device may enter the factory set step and reboot and may output a screen 1040 indicating that the factory set step and rebooting are in progress.

According to various embodiments of the present invention, upon determining that the plurality of SIMs is recognized in another status than the OOB status so that the full user configuration function need not be performed, the electronic device may perform an operation for applying the network configuration of the software configuration related to the selected SIM to the electronic device and output a screen 1050 to display relevant content.

Figure 11:
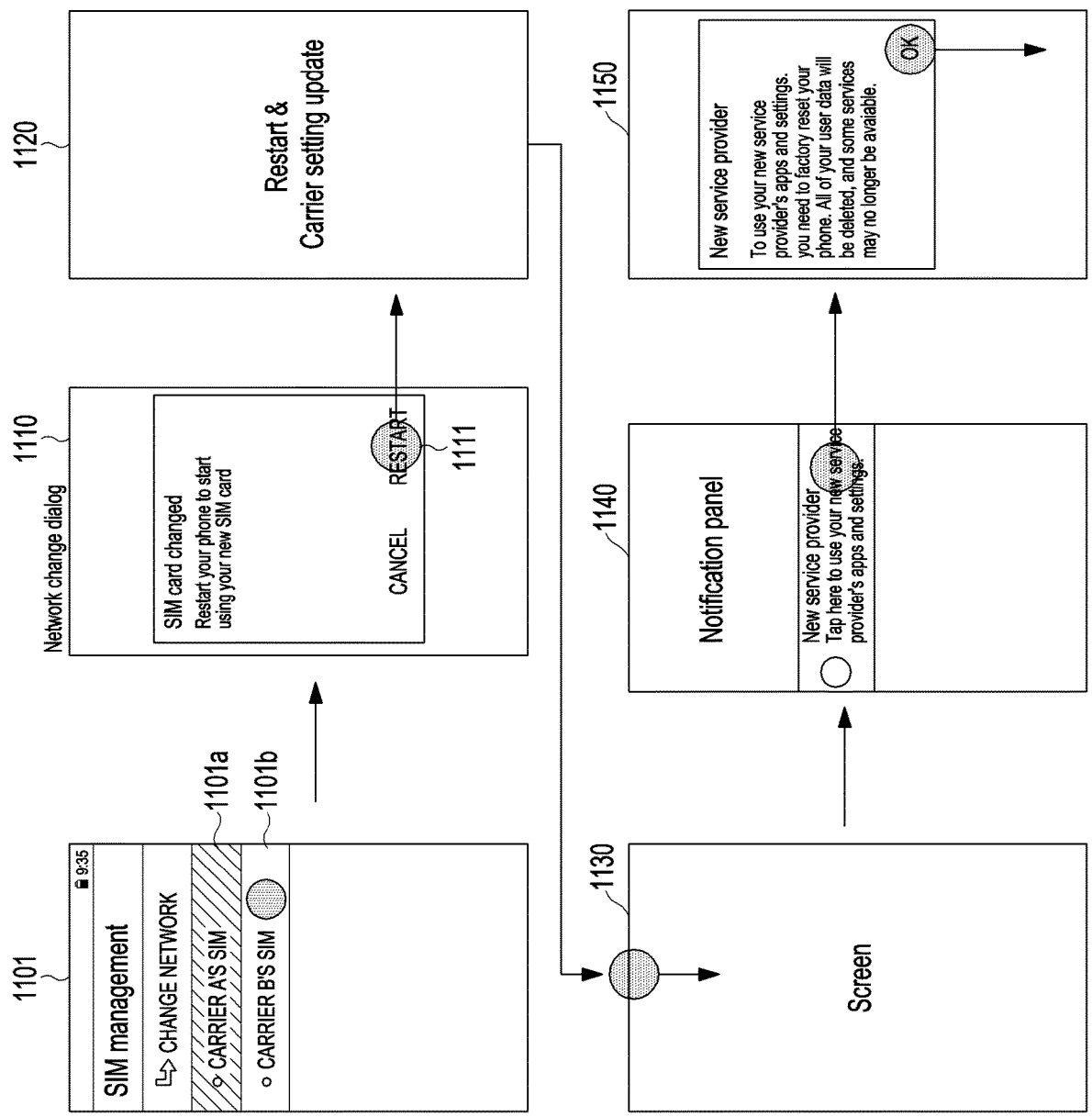
FIG. 11 is a flowchart illustrating an example operation of applying a software configuration when a plurality of SIMs is recognized in an electronic device according to various embodiments of the present invention.

FIG. 11 is a flowchart illustrating an example operation of applying a software configuration when a plurality of SIMs is recognized in an electronic device according to various embodiments of the present invention.

According to various embodiments of the present invention, display of the screen 1101 to the screen 1150 may be controlled by any one of the electronic device 101, 201, 401, or 500, the processor 120, 210, or 510, or the program module 310.

According to various embodiments of the present invention, the electronic device may provide a SIM management application for selecting and configuring software for a plurality of SIMs recognized in the electronic device.

Referring to FIG. 11, when the SIM management application is executed, the electronic device 500 may display a list of a plurality of SIMs (e.g., carrier A's SIM 1101a or carrier B's SIM 1101b) recognized in the electronic device on the screen 1101 of the application. For example, the electronic device may perform processing so that a SIM (e.g., carrier A's SIM 1101a) designated as a primary SIM or default data slot among the plurality of SIMs and in which default software is applied to the electronic device may be highlighted on the screen 1101 of the application.

According to various embodiments of the present invention, the electronic device may receive a selection input for carrier B's SIM 1101b among the plurality of SIMs. For example, as the selection input is received, the electronic device may identify the network code of carrier B's SIM 1101b and output a screen 1110 including buttons and a message indicating that the network configuration is changed in the applied software. The buttons may include a cancel button for canceling the operation of changing the network configuration and a restart button 1111 for performing restart to change the network configuration.

According to various embodiments of the present invention, if the restart button is selected, the electronic device may perform control to reboot and may output a screen 1120 indicating that reboot is in progress and the network configuration is changed.

According to various embodiments of the present invention, if reboot is done, the electronic device may display a predesignated screen 1130. For example, upon receiving a gesture input from up to down on the screen 1130, the electronic device may display a notification panel 1140 including a message indicating that the network configuration of the electronic device is changed in relation to carrier B's SIM.

According to various embodiments of the present invention, if the message on the notification panel 1140 is selected, the electronic device may include content indicating that the factory set step is required to change the network configuration of the software related to carrier B's SIM and apply the same to the electronic device and an 'OK' button. For example, if the 'OK' button is selected, the electronic device may restart, and the network configuration of the software of the electronic device may be changed into the settings corresponding to the network dependent element related to carrier B's SIM.

Figure 12:
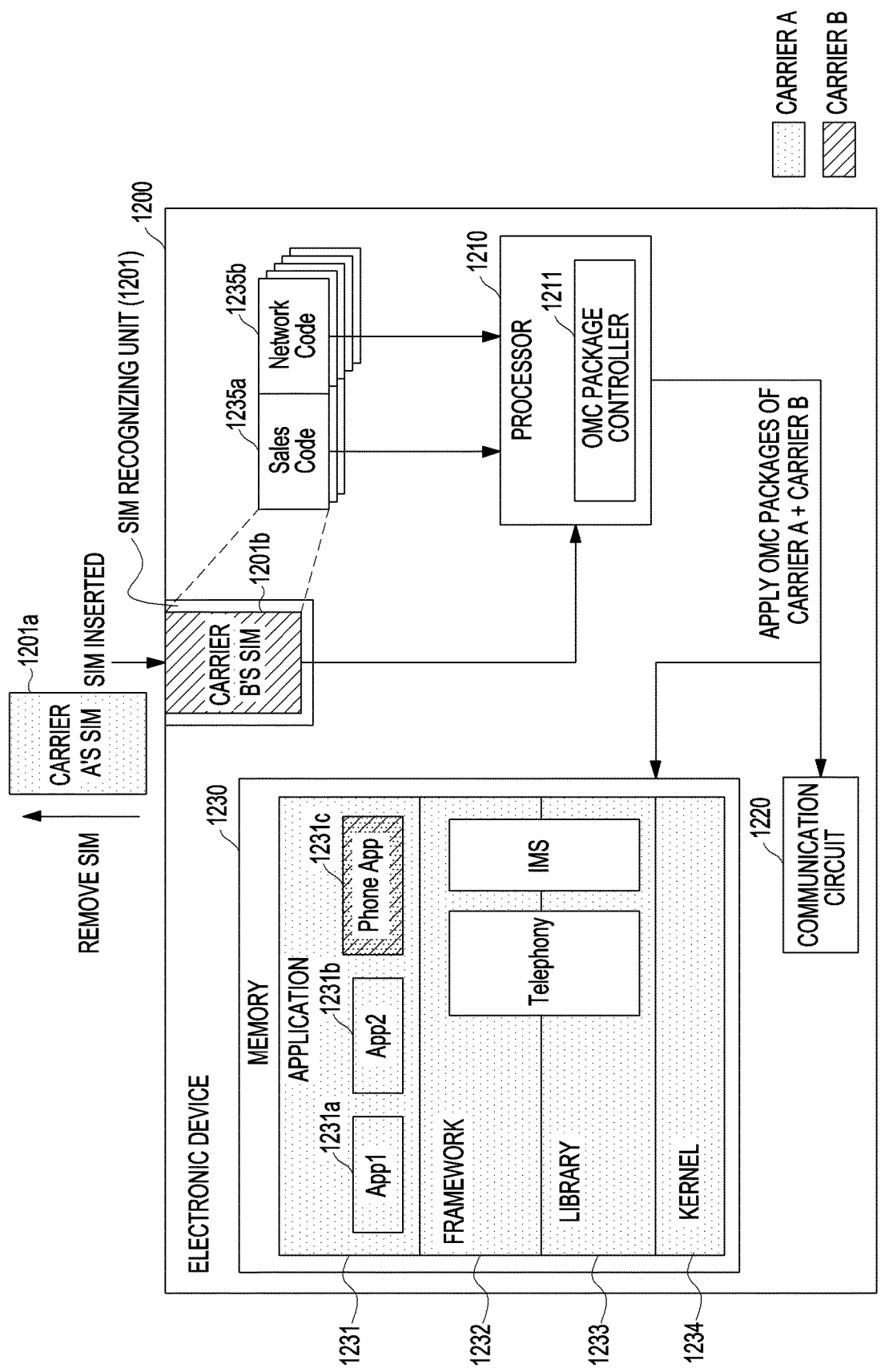
FIG. 12 is a view illustrating an example screen configuration for applying a software configuration in an electronic device according to various embodiments of the present invention.

FIG. 12 is a view illustrating an example screen configuration for applying a software configuration in an electronic device according to various embodiments of the present invention.

Referring to FIG. 12, an electronic device 1200 may include a SIM recognizing unit 1201, a processor 1210 (e.g., the processor 510 of FIG. 5), a communication circuit 1220 (e.g., the communication circuit 520 of FIG. 5), and a memory 1230 (e.g., the memory 530 of FIG. 5).

According to various embodiments of the present invention, the processor 1210 may include an OMC package controller 1211. Although the processor 1210 includes the OMC package controller 1211 in the illustration, the OMC package controller 1211 may be omitted or modified and, if the OMC package controller 1211 is omitted, the processor 1210 may perform control to perform operations of the corresponding component.

According to various embodiments of the present invention, the communication circuit 1220 may perform wireless communication with an external electronic device.

According to various embodiments of the present invention, the memory 1230 may include an application 1231 including at least one application (e.g., app1 1231a, app2 1231b, or a phone app 1231c) and a framework 1232 and libraries 1233 or kernel 1234 (e.g., the kernel 141 of FIG. 1 or the kernel 320 of FIG. 3) to control at least part of the functions of a telephony module or IP multimedia subsystem (IMS) module.

According to various embodiments of the present invention, the memory 1230 may include instructions (or codes) for performing the operations of the processor 510 of FIG. 5 and data stored in the memory 530. The processor 1210 may perform control to load the instructions and data up on the processor 1210.

According to various embodiments of the present invention, the OMC package controller 1211 may identify recognition or removal of an SIM via the SIM recognizing unit 1201 and identify the sales code of the recognized SIM and the network code corresponding to the recognized SIM. For example, as carrier A's SIM 1201 is inserted and removed, then carrier B's SIM 1201b is inserted, the OMC package controller 1211 may identify the network code 1235b of carrier B's SIM 1201b.

According to various embodiments of the present invention, upon determining that an eSIM previously set in the electronic device 1200 is activated, the SIM recognizing unit 1201 may determine that a SIM is recognized. If an eSIM profile of a particular eSIM is selected or is changed into a different eSIM profile, the SIM recognizing unit 1201 may determine that the selected or changed eSIM is recognized.

According to various embodiments of the present invention, the OMC package controller 1211 may identify the OMC package of carrier B's SIM 1201b in the OMC package DB stored in the electronic device 1200. For example, the OMC package of carrier B's SIM 1201b may include network dependent elements and non-network dependent elements.

According to various embodiments of the present invention, the OMC package controller 1211 may generate a new OMC package based on the OMC package of carrier B's SIM 1201b and apply it to each component of the electronic device 1200. For example, the generated OMC package may include the non-network dependent elements in the OMC package of carrier A's SIM 1201*a* which was inserted and then removed and the network dependent elements in the OMC package of carrier B's SIM 1201*b*.

According to various embodiments of the present invention, the OMC package controller 1211 may apply the non-network dependent element included in the generated OMC package to the overall configuration of the electronic device 1200 and apply the network dependent elements to network communication-related components (e.g., the telephony module, IMS module, or communication circuit 1220).

According to various embodiments of the present invention, features for setting the IMS module may include, e.g., whether the IMS is supported, whether VoLTE is supported, whether VoLTE is supported via Wi-Fi, whether voice calls are supported via LTE, whether SMS services are supported via IP, or whether the RCS is supported. For example, setting values (e.g., true or false) for each feature for setting the IMS module may be set in the network dependent elements stored in the OMC package.

According to various embodiments of the present invention, at least some of the network dependent elements and the non-network dependent elements may be applied to the phone application 1231*c*. For example, setting values included in the non-network dependent elements may be applied to elements related to the screen or UI/UX of the phone application 1231*c*, and setting values included in the network dependent elements may be applied to the call generating feature to be generated in a type designated according to carrier B.

Figure 13A:
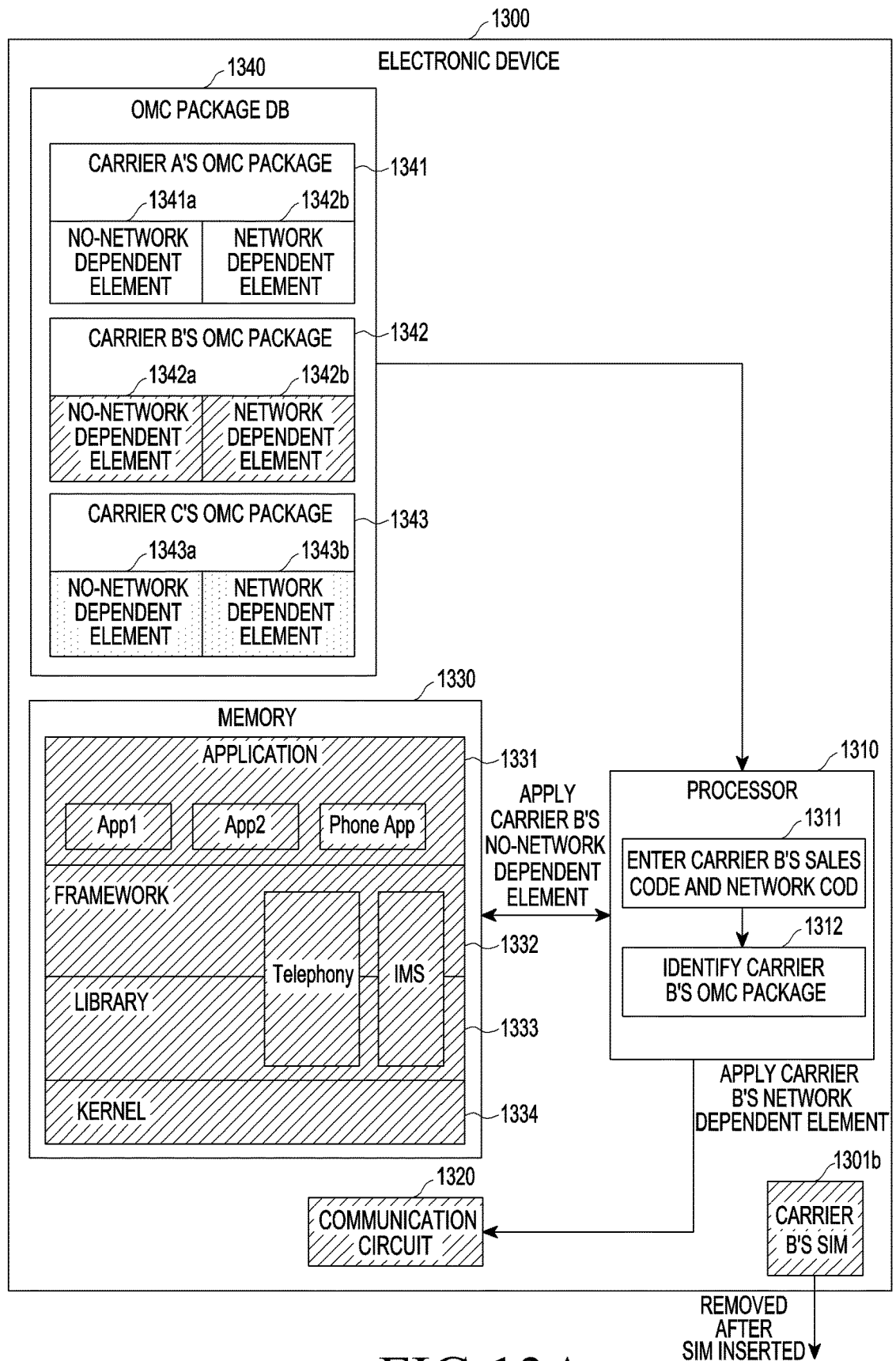
FIGS. 13A and 13B are block diagrams illustrating various example electronic device configurations for applying a software configuration in an electronic device according to various embodiments of the present invention.
Figure 13B:
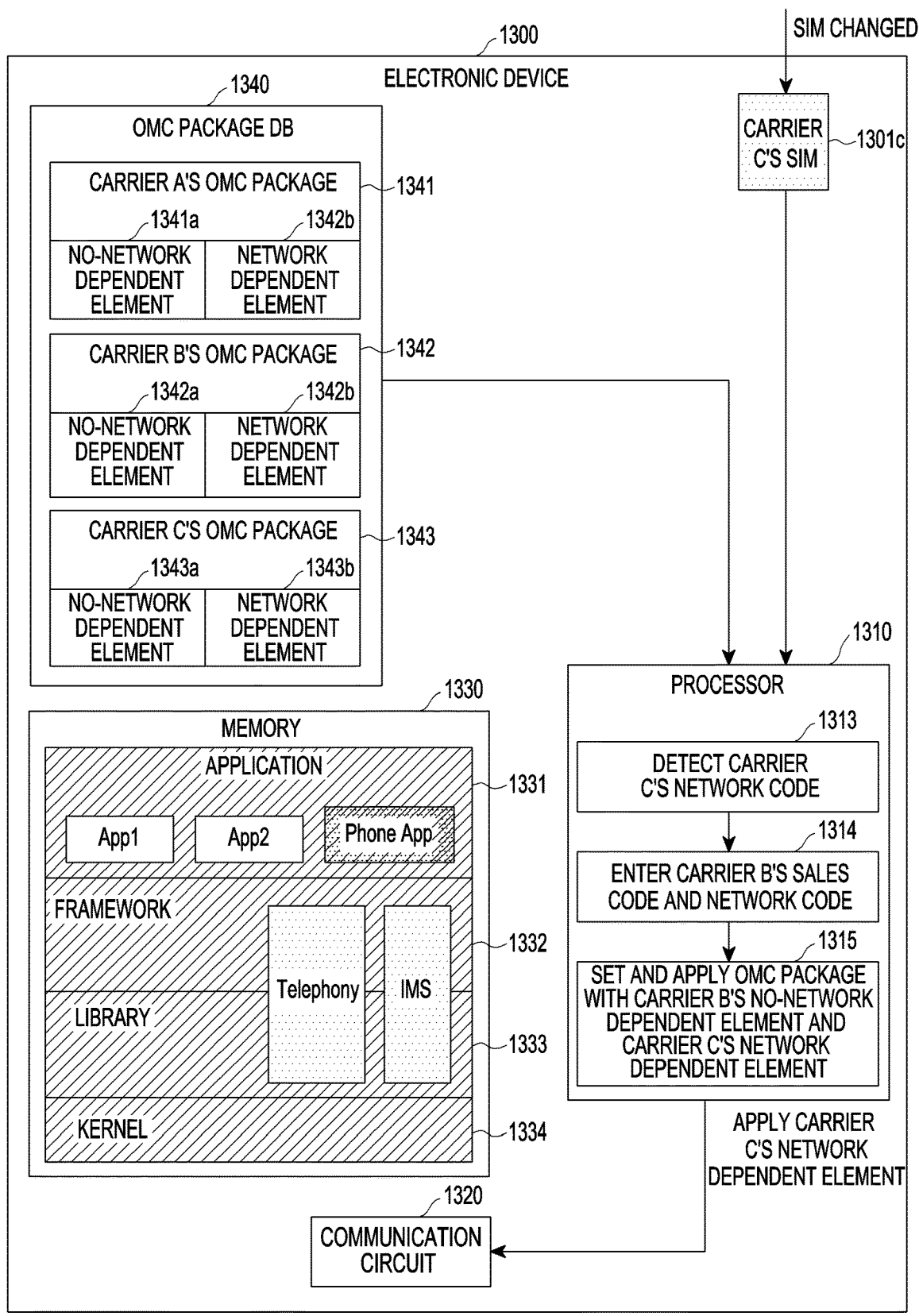

FIGS. 13A and 13B are block diagrams illustrating various example electronic device configurations for applying a software configuration in an electronic device according to various embodiments of the present invention.

According to various embodiments of the present invention, an electronic device 1300 may include a processor 1310 (e.g., the processor 510 of FIG. 5), a communication circuit 1320 (e.g., the communication circuit 520 of FIG. 5), a memory 1330 (e.g., the memory 530 of FIG. 5), or an OMC package DB 1340 (e.g., the OMC package DB 531 of FIG. 5).

If an SIM is recognized, the processor 1310 may identify the sales code of the recognized SIM and the network code corresponding to the recognized SIM and configure an OMC package.

The memory 1330 may include an application 1331 including at least one application (e.g., app1, app2, or phone app), a framework or libraries for controlling at least some of the functions of the telephony module or IMS module, or a kernel.

The OMC package DB 1340 may store OMC packages, for a plurality of carriers, which include non-network dependent elements and network dependent elements. For example, although the OMC package DB 1340 is a separate component from the memory 1330 in the illustration, the OMC package DB 1340 may be internally connected with the memory 1330 and be stored in the memory 1330.

According to various embodiments of the present invention, the memory 1330 may include instructions (or codes) for performing the operations of the processor 510 of FIG. 5 and data stored in the memory 530. The processor 1310 may perform control to load the instructions and data up on the processor 1310.

Referring to FIG. 13A, in operation 1311, the processor 1310 of the electronic device 1300, if carrier B's SIM 1301*b* is recognized, may identify entry of the sales code of carrier B's SIM 1301*b* and the network code corresponding to the SIM 1301*b*.

In operation 1312, the processor 1310 may identify carrier B's OMC package 1342 in the OMC package DB 1340 based on the network code of carrier B's SIM 1301*b*.

According to various embodiments of the present invention, if carrier B's SIM 1301*b* is the SIM first recognized since the factory set step, the electronic device 1300 may apply the network dependent element 1342*b* and the non-network dependent element 1342*a* included in carrier B's OMC package 1342 to each element of the electronic device 1300. For example, the processor 1310 may apply the setting value included in the non-network dependent element 1342*a* to the memory 1330 and the setting value included in the network dependent element 1342*b* to the communication circuit 1320.

According to various embodiments of the present invention, the electronic device 1300 may identify that recognized carrier B's SIM 1301*b* is removed.

Referring to FIG. 13B, the electronic device 1300 may identify carrier C's SIM 1301*c* is recognized after carrier B's SIM 1301*b* is removed.

In operation 1313, the processor 1310 may detect the network code of carrier C's SIM 1301*c* recognized.

In operation 1314, the processor 1310 may receive input of the sales code and network code of recognized carrier C's SIM 1301C.

According to various embodiments of the present invention, the processor 1310 may identify carrier C's OMC package 1343 in the OMC package DB 1340 based on the network code of carrier C's SIM 1301*c*. Carrier C's OMC package 1343 may include a non-network dependent element 1343*a* and a network dependent element 1343*b*.

In operation 1315, the processor 1310 may set the OMC package with carrier B's non-network dependent element 1342*a* and carrier C's network dependent element 1343*b* and apply the OMC package to the electronic device 1300.

According to various embodiments of the present invention, the processor 1310 may apply the setting value included in carrier B's non-network dependent element 1342*a* to the overall memory 1330 and the setting value included in carrier C's network dependent element 1343*b* to some network-related modules (the telephony module or IMS module) among the modules stored in the memory 1330 and the communication circuit 1320. Both the network dependent element and the non-network dependent element may be applied to applications (e.g., the phone application) which perform both network-related configuration (e.g., the call generating feature) and network-irrelevant configuration (e.g., screens or UI/UX configuration).

Figure 14:
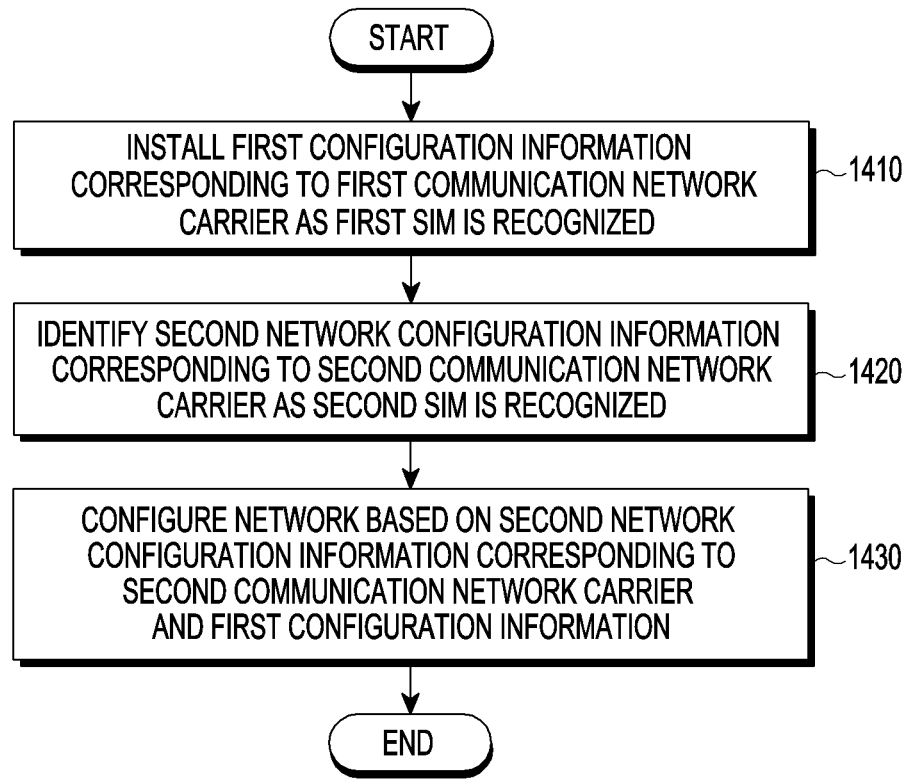
FIG. 14 is a flowchart illustrating an example operation of configuring software based on a SIM in an electronic device according to various embodiments of the present invention.

FIG. 14 is a flowchart illustrating an example operation of configuring software based on a SIM in an electronic device according to various embodiments of the present invention.

According to various embodiments of the present invention, operations 1410 to 1430 may be performed by any one of the electronic device 101, 201, 401, or 500, the processor 120, 210, or 510, or the program module 310.

Referring to FIG. 14, in operation 1410, the electronic device 500 may install first configuration information corresponding to a first communication network operator among a plurality of communication network operators as a first subscriber identity module including information about the first communication network operator recognized in the electronic device.

In operation 1420, the electronic device may identify second network configuration information corresponding to a second communication network operator among the plurality of communication network operators as a second subscriber identity module including information about the second communication network operator is recognized in the electronic device.

In operation 1430, the electronic device may configure a network of the electronic device based on first network configuration information included in the first configuration information and second network configuration information corresponding to the second communication network operator.

According to various embodiments of the present invention, the method of configuring software based on the subscriber identity module in the electronic device may further comprise identifying configuration information about the plurality of communication network operators and storing, in a memory of the electronic device, the configuration information, with the configuration information divided into network configuration information for configuring the network of the electronic device and non-network configuration information for configuring a function other than the network.

According to various embodiments of the present invention, the method of configuring software based on the subscriber identity module in the electronic device may further comprise, upon identifying that the second subscriber identity module is recognized in the electronic device, outputting a screen for identifying whether to install the whole second configuration information corresponding to the second communication network operator and controlling the electronic device based on the second configuration information according to an input received on the screen.

According to various embodiments of the present invention, the method of configuring software based on the subscriber identity module in the electronic device may further comprise, upon identifying that a plurality of subscriber identity modules is recognized, outputting a screen for receiving selection of one of the plurality of subscriber identity modules and configuring the network of the electronic device based on third network configuration information about a third subscriber identity module selected from among the plurality of subscriber identity modules according to an input received on the screen.

According to various embodiments of the present invention, the method of configuring software based on the subscriber identity module in the electronic device may further comprise identifying the second configuration information corresponding to the second subscriber identity module upon identifying that the second subscriber identity module is recognized as the first subscriber identity module is removed, and controlling a communication circuit of the electronic device or a network-related application stored in a memory of the electronic device based on the second configuration information and first non-network configuration information of the first configuration information.

According to various embodiments of the present invention, the method of configuring software based on the subscriber identity module in the electronic device may further comprise installing a designated application or resource based on the first non-network configuration information of the first configuration information.

According to various embodiments of the present invention, the method of configuring software based on the subscriber identity module in the electronic device may further comprise configuring a screen of the application based on the first non-network configuration information, for a network-related application among applications stored in a memory of the electronic device and controlling a function performed using a communication circuit of the electronic device among functions of the network-related application based on the second network configuration information.

According to various embodiments of the present invention, the method of configuring software based on the subscriber identity module in the electronic device may further comprise receiving configuration information about the plurality of communication network operators from a server.

According to various embodiments of the present invention, the method of configuring software based on the subscriber identity module in the electronic device may further comprise transferring the second network configuration information to a communication circuit of the electronic device so that the network of the electronic device is configured based on the second network configuration information.

According to various embodiments of the present invention, the method of configuring software based on the subscriber identity module in the electronic device may further comprise installing, on the electronic device, an open market customization (OMC) package based on the second network configuration information and the first non-network configuration information included in the first configuration information.

The term 'module' may refer to a unit including one of hardware, software, and firmware, or a combination thereof. The term 'module' may be interchangeably used with, e.g., a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to various embodiments of the present invention, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present invention, and vice versa.

Modules or program modules in accordance with various embodiments of the present disclosure may include at least one or more of the aforementioned components, omit some of them, or further include other additional components.

Operations performed by modules, program modules or other components in accordance with various embodiments of the present invention may be carried out sequentially, simultaneously, repeatedly, or heuristically. Furthermore, some of the operations may be performed in a different order, or omitted, or include other additional operation(s).

The embodiments disclosed herein are proposed for description and understanding of the disclosed technology and does not limit the scope of the present invention. Accordingly, the scope of the present invention should be interpreted as including all changes or various embodiments based on the technical spirit of the present invention.

The invention claimed is:

1. An electronic device, comprising:
    a communication circuit configured to transmit and receive data based on at least one piece of network information;
    a processor; and
    a memory, wherein
    the memory stores instructions configured to, when executed, enable the processor to:
        when a first subscriber identity module including information about a first communication network operator is inserted into the electronic device, install first configuration information corresponding to the first communication network operator among a plurality of communication network operators, the first configuration information including first network configuration information for configuring the communication circuit and first application configuration information for configuring at least one application stored in the memory;
        when the first subscriber identity module is removed from the electronic device and a second subscriber identity module including information about a second communication network operator is inserted into the electronic device, identify second configuration information corresponding to the second communication network operator among the plurality of communication network operators, generate third configuration information including the first application configuration information to be used for configuring the at least one application and second network configuration information of the second configuration information to be used for configuring the communication circuit, configure the at least one application based on the first application configuration information, and configure the communication circuit based on the second network configuration information; and
        when an input associated with the second configuration information is received from a user, configure the at least one application based on second application configuration information of the second configuration information,
    wherein the first configuration information, the second configuration information and the third configuration information are stored as files in the memory.

2. The electronic device of claim 1, wherein the instructions are configured to enable the processor to, upon identifying that a plurality of subscriber identity modules are recognized, output a screen for receiving selection of one of the plurality of subscriber identity modules and control a network of the electronic device based on third network configuration information about a third subscriber identity module selected from among the plurality of subscriber identity modules according to an input received on the screen.

3. The electronic device of claim 1, wherein the instructions are configured to enable the processor to configure a screen of an application based on the first application configuration information, for a network-related application among applications stored in the memory and control a function performed using the communication circuit among functions of the network-related application based on the second network configuration information.

4. The electronic device of claim 1, wherein the instructions are configured to enable the processor to receive configuration information about the plurality of communication network operators from a server through the communication circuit.

5. The electronic device of claim 1, wherein the instructions are configured to enable the processor to transfer the second network configuration information to the communication circuit so that a network of the electronic device is configured based on the second network configuration information.

6. The electronic device of claim 1, wherein the instructions are configured to enable the processor to install, on the electronic device, an open market customization (OMC) package based on the second network configuration information and the first application configuration information included in the first configuration information.

7. A method of configuring software based on a subscriber identity module in an electronic device, the method comprising:
    when a first subscriber identity module including information about a first communication network operator is inserted into the electronic device, installing first configuration information corresponding to the first communication network operator among a plurality of communication network operators, the first configuration information including first network configuration information for configuring a communication circuit and first application configuration information for configuring at least one application stored in a memory of the electronic device;
    when the first subscriber identity module is removed from the electronic device and a second subscriber identity module including information about a second communication network operator is inserted into the electronic device, identifying second configuration information corresponding to the second communication network operator among the plurality of communication network operators, generating third configuration information including the first application configuration information to be used for configuring the at least one application and second network configuration information of the second configuration information to be used for configuring the communication circuit, configure the at least one application based on the first application configuration information, and configuring the communication circuit based on the second network configuration information; and
    when an input associated with the second configuration information is received from a user, configuring the at least one application based on second application configuration information of the second configuration information,
    wherein the first configuration information, the second configuration information and the third configuration information are stored as files in the memory.

8. The method of claim 7, further comprising:
upon identifying that a plurality of subscriber identity modules are recognized, outputting a screen for receiving selection of one of the plurality of subscriber identity modules; and
configuring a network of the electronic device based on third network configuration information about a third subscriber identity module selected from among the plurality of subscriber identity modules according to an input received on the screen.

9. The method of claim 7, further comprising:
configuring a screen of an application based on the first application configuration information, for a network-related application among applications stored in a memory of the electronic device; and
controlling a function performed using a communication circuit of the electronic device among functions of the network-related application based on the second network configuration information.

10. The method of claim 7, further comprising receiving configuration information about the plurality of communication network operators from a server.

11. The method of claim 7, further comprising transferring the second network configuration information to a communication circuit of the electronic device so that a network of the electronic device is configured based on the second network configuration information.

* * * * *